United States Patent [19]

Van Rheenen et al.

[11] Patent Number: 5,312,863
[45] Date of Patent: May 17, 1994

[54] CATIONIC LATEX COATINGS
[75] Inventors: Paul R. Van Rheenen, Warminster; Chuen-Shyong Chou, Dresher, both of Pa.
[73] Assignee: Rohm and Haas Company, Philadelphia, Pa.
[21] Appl. No.: 855,150
[22] Filed: Mar. 20, 1992

Related U.S. Application Data

[60] Continuation of Ser. No. 593,359, Oct. 1, 1990, abandoned, which is a division of Ser. No. 375,653, Jul. 5, 1989, abandoned.

[51] Int. Cl.$^5$ .............................................. C08L 39/00
[52] U.S. Cl. .................... 524/555; 524/560; 524/813; 524/189
[58] Field of Search ............... 524/813, 555, 560, 189

[56] References Cited

U.S. PATENT DOCUMENTS

| | | |
|---|---|---|
| 2,926,108 | 8/1957 | Anderson . |
| 3,336,229 | 10/1963 | Lutz . |
| 3,356,627 | 6/1963 | Scott . |
| 3,404,114 | 6/1965 | Snyder et al. . |
| 3,637,565 | 11/1965 | Sheetz . |
| 3,847,857 | 11/1973 | Haag et al. . |
| 3,926,890 | 12/1972 | Huang et al. . |
| 3,969,296 | 2/1975 | Wassenburg et al. . |
| 4,051,093 | 9/1977 | Wendel et al. ................ 524/815 |
| 4,248,754 | 12/1978 | Fox et al. . |
| 4,254,003 | 7/1978 | Fox et al. . |
| 4,308,189 | 1/1981 | Moritani et al. ................ 526/202 |
| 4,375,440 | 6/1981 | Schreck . |
| 4,399,254 | 9/1981 | Das et al. . |
| 4,710,526 | 7/1986 | Tokumoto et al. . |
| 4,871,594 | 10/1989 | Bister et al. ................ 524/815 |

FOREIGN PATENT DOCUMENTS

| | | |
|---|---|---|
| 1430488 | 6/1988 | Australia . |
| 14304/88 | 10/1988 | Australia . |
| 6748 | 1/1977 | Japan . |
| 63366 | 10/1980 | Japan . |
| 131374 | 8/1981 | Japan . |
| 23969 | 2/1983 | Japan . |
| 155413 | 9/1984 | Japan . |
| 59-155413 | 9/1984 | Japan . |
| 32860 | 2/1985 | Japan . |
| 187702 | 8/1987 | Japan . |

OTHER PUBLICATIONS

*Developments In Ureido Functional Monomer for Promoting Wet Adhesion in Latex Paints;* R. W. Kreis and A. M. Sherman, Water-Borne and Higher Coating Symposium Feb. 3-5, 1988, New Orleans.

B. Alince *Performance of Cationic Latex as a Wet-End Additive,* Tappi, vol. 60.

*McCutchen's Detergents and Emulsifiers* (MC Publishing Co., Glen Rock, N.J).

Functional Monomers vol. 2, R. H. Yocum and E. B. Nyquist, eds. Marcel Dekker, Inc., N.Y. 1974) at 555-739.

Doulite Ion-Exchange Manual, edited by Technical Staff at the Resinuous Products Div. of Diamond Shamrock Co.

Polymers Paint Color Journal, vol. 178 No. 4216 p. 471 (1988).

Bilek, J. J., *Paint Technology,* 39 (506), 328 (1967) Study of Lead Pigments In Water Thinned Prime Coats For Wood.

*Primary Examiner*—Joseph L. Schofer
*Assistant Examiner*—Jeffrey T. Smith
*Attorney, Agent, or Firm*—Ronald D. Bakule

[57] ABSTRACT

A novel coating composition, exhibiting improved adhesion to anionic substrates and a process for its preparation and use, is disclosed. The coating contains an aqueous dispersion of a cationic polymeric binder. The polymeric binder is preferably prepared by the polymerization of at least one monoethylenically unsaturated monomer, having amine functionality, in the presence of at least one nonionic or amphoteric surfactant, followed by the subsequent neutralization of the polymer using selected acids. Coatings containing the cationic latex polymeric binder and selected cationic pigment dispersants are provided. In addition, by selecting certain process conditions and reactive pigments, completely cationic aqueous coating compositions, which maintain the advantages of a water-based system while exhibiting excellent stain blocking, corrosion resistance, water sensitivity resistance and adhesion to wood and alkyd surfaces, and which are competitive in their performance with conventional solvent based alkyd primers and paints, are disclosed.

6 Claims, 1 Drawing Sheet

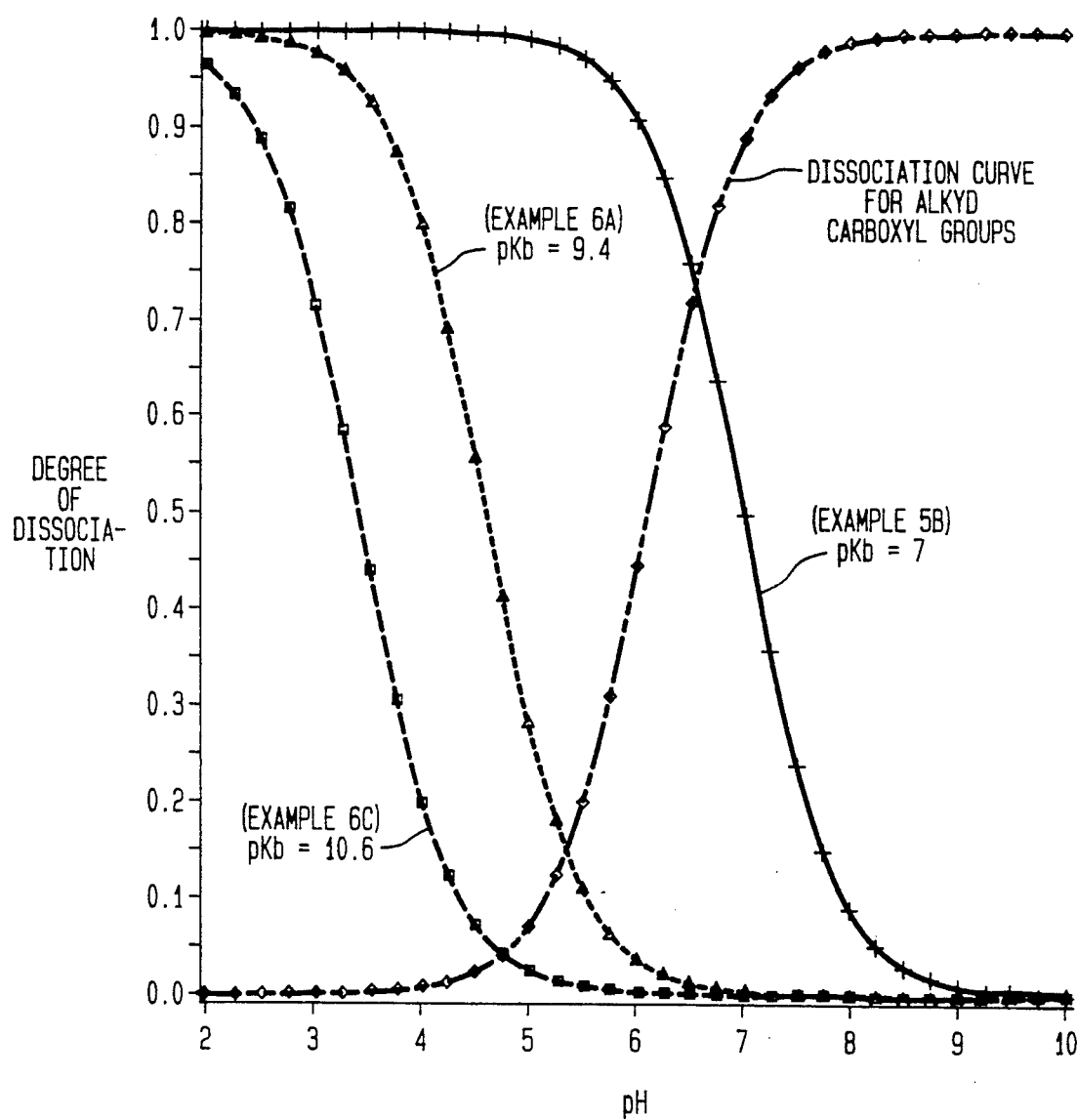

CATIONIC LATEX COATINGS

This application is a continuation of application Ser. No. 593,359, filed Oct. 1, 1990 now abandoned. which is a division of application Ser. No. 375,653, filed Jul. 5, 1989 now abandoned.

FIELD OF THE INVENTION

This invention is directed to coating compositions, containing a cationic polymeric binder, which exhibit improved adhesion to anionic substrates. More particularly, the invention relates to the selection and preparation of cationic latex polymer binders for maximum adhesion to anionic substrates, and to the combination of such polymeric binders with at least one cationic pigment dispersant, which selectively binds with pigment particles in the coating composition rather than competing with the cationic latex binder for adhesion sites on the substrate, and furthermore with selected reactive pigment systems which improve the corrosion resistance and stain blocking of the coating composition.

BACKGROUND OF THE INVENTION

Improvements to aqueous-based latex paints have resulted in their wide- scale commercial use for many end use applications. In some applications, such as for example in interior paints, aqueous-based latex paints have substantially displaced conventional non-aqueous solvent based paints.

Conventional aqueous based coatings have not, however, significantly displaced solvent-based systems as primers for use on previously painted ("repaint") surfaces and on a variety of different types of substrates due to their inability to provide the desired combination of adhesion and stain blocking that solvent based alkyd primers can provide. In general, it is very difficuft, under wet or moist testing conditions for conventional aqueous based latex coatings to provide sufficiently adequate adhesion to old repaint alkyd painted substrates, chalky weathered paint, and wood.

In addition to adhesion, primers must have the ability to block stains. "Stainblocking" refers to the ability of a coating to prevent water soluble stains, present in or on a substrate or substrate coating, from migrating through a newly applied coating. These stains may result from the presence of certain chemicals in the substrate itself. For example, certain woods such as redwood, cedar, mahogany and the like contain tannin and lignin staining agents which are particularly concentrated in the knots and grains. If contacted by a conventional aqueous latex coating, these staining agents become extracted from the wood and migrate through the coating to the air interface. Repeated applications of the same or a similar type of aqueous latex coating will not successfully prevent these stains from reappearing on the new coating surface. Other water soluble stains which present the same type of problem include marks made by children's markers, felt or ballpoint pens and stains due to water damage on ceilings or walls. All these water soluble stains are effectively blocked by solvent based coatings in which the stain is not solubilized by the coating solvent.

While solvent based alkyd coatings have certain desirable film properties, aqueous based coatings are preferred in many ways over solvent based coatings like alkyds. One reason is due to the potential environmental, health and safety concerns caused by the organic solvents in the coating formulation. In addition, alkyd coatings are not generally as crack and flake resistant as latex based coatings, particularly in exterior applications. Furthermore, alkyds do not perform well over alkaline, cement based substrates, have poor adhesion to galvanized steel, and do not offer the easy water cleanup possible with aqueous latex coatings.

Therefore, it would be desirable if workers in the art could develop an aqueous latex coating which could be used as a substitute for solvent based alkyd coatings, such as for example as a primer coating, to provide the desirable adhesion and stain blocking properties of conventional alkyd coatings as well as the other desirable properties of conventional aqueous based latex coatings.

DESCRIPTION OF THE PRIOR ART

Conventional aqueous latex coatings are anionic. They contain anionic latex polymer binders which are typically prepared by aqueous emulsion polymerization using non-ionic surfactants, anionic surfactants or combinations thereof. These anionic latex polymer binders are combined with pigments and extenders and dispersed with anionic pigment dispersants to form the aqueous latex coating. The anionic polymeric binders typically contain anionic functional groups such as sulfate and carboxylate groups. It is known in the art that further functionalization of these anionic latex polymers with amines, acetoacetate, or amides such as for example ethylene urea derivatives can assist in the adhesion of coatings containing these polymeric binders. A review article *Developments in Ureido Functional Monomer for Promoting Wet Adhesion in Latex Paints;* R. W. Kreis and A. M. Sherman, Water-Borne and Higher-Solids Coating Symposium Feb. 3-5, 1988, New Orleans, La., discusses the use of these functionalities to obtain adhesion under wet conditions. The following U.S. Patents disclose the use of such functional groups to assist in the adhesion of aqueous latex coatings to substrates: U.S. Pat. Nos. 3,356,627; U.S. Pat. Nos. 3,404,114, 3,637,565; U.S. Pat. No. 4,248,754; U.S. Pat. No. 4,254,003 and U.S. Pat. No. 4,375,440.

U.S. Pat. No. 3,356,627 is directed to aqueous blends of two water insoluble polymers, one of which being formed from 1 to 15 percent of a polar monomer selected from alcoholic hydroxyl, amino, carboxylic and amide and ureido groups, for use as coating and impregnating compositions having improved adhesion to wood. The '627 patent teaches formulating pigmented compositions using pigment dispersants and stabilizing auxiliary surfactants of the non-ionic, cationic or anionic type. The rheological characteristics of the paint may be accomplished by reacting the carboxylic substituents on the polymer with ammonium hydroxide to form the ammonium carboxylate of the ester copolymer. The aqueous dispersion paint is ordinarily adjusted to an alkaline state of pH of 7.5 to pH 10 using ammonium hydroxide.

U.S. Pat. No. 3,404,114 is also directed to the preparation of latex polymers which purport to yield adherent films. The polymers are formed from about 1-25 percent of an unsaturated carboxylic acid, 50-98 percent of monovinylidene monomer and 1-25 percent of an alkylamino alkylester of an unsaturated ester. The polymer is formed by emulsion polymerizing the unsaturated carboxylic acid and a portion of the monovinylidene monomer followed by the addition of a liquid nitrogenous neutralizing reagent, such as for example ammonia or ammonium hydroxide to raise the pH of the system to a pH of at least 7 and preferably pH 7.5 to 8.5. After the pH adjustment, a second charge of monomers consisting of the remainder of the monovinylidene component and the alkylamino alkylester of an ethylenically unsaturated carboxylic acid. In order to form stable polymer dispersions the '114 patent discloses the use of nonionic or anionic surfactants at a concentration of from about 0.1 to 10 weight percent of the monomer mixture.

U.S. Pat. No. 3,637,565 is directed to latex compositions having improved adhesion to polar substrates. The cationic lattices are prepared by emulsion polymerization at pH below pH 7 of a primary or secondary amino alcohol ester of an alpha-beta ethylenically unsaturated carboxylic acid or a primary or secondary amino alcohol half ester of an alpha, beta ethylenically unsaturated dicarboxylic acid with at least one other polymerizable ethylenically unsaturated substantially water insoluble monomer. Preferably a nonionic surfactant alone or optionally a nonpolymerizable low molecular weight cationic surfactant is used during the polymerization. The cationic latex may be converted into a stable anionic latex by adding a nonionic surfactant, if such surfactant is not added prior to the polymerization of monomers, to stabilize the latex during subsequent pH adjustment to a pH greater than 8, and usually from pH 9 to pH 10, preferably by the addition of ammonium hydroxide. The anionic latex so formed is compatible with conventional formulating ingredients used to produce coating and impregnating compositions and the resofting product so formed is disclosed to contribute wet and dry adhesion to dried film compositions or coatings. The latex is disclosed as being useful for preparing coating and impregnating compositions especially useful for adhesion to polar substrates such as paper coatings, fabric coatings and the like. When preparing an aqueous paint dispersion using the latex the '565 patent discloses the use of wetting and dispersing agents such as polyphosphates and pyrophosphates or anionic and nonionic surfactants.

U.S. Pat. No. 4,248,754 is directed to aqueous dispersions of polymer particles for adhesion to a substrate under moist conditions. The polymer comprises polar groups, selected from amine, ureido and thioureido groups; a proportion of monomer units derived from acrylamide and methacrylamide; and a proportion of poly(alkylene oxide).

U.S. Pat. No. 4,254,003 is also directed to an aqueous dispersion of anionic polymer particles useful in paint compositions exhibiting good moisture resistance. The polymers comprise polar groups selected from amine, ureido and thioureido groups and poly(alkylene oxide) chains.

U.S. Pat. No. 4,357,440 is directed to the use of 2 hydroxy 3-t-butylamino-1-propyl methacrylate as a wet adhesion aid for latex paints to improve adhesion of the latex coating to the substrate.

It is also known that adhesion between anionic substrates and cationically dispersed materials can occur through columbic interactions and the formation of ionic bonds. B. Alince *Performance of Cationic Latex as a Wet-end Additive* TAPPI, Vol. 60 (12/1977) discloses that the deposition of amino and quaternized latexes on anionic pulp fibers occurs due to columbic interactions which are pH dependent.

U.S. Pat. No. 3,926,890 discloses the preparation and use of quaternary functional latexes to provide adsorption to substrates such as pulp, and paper. These polymers are prepared by the emulsion polymerization of a haloalkyl ester of acrylic or methacrylic acid with other monoethylencially unsaturated compounds and /or a conjugated diene in the presence of nonionic and/or cationic surfactants and then treating the copolymer with a basic nitrogen containing compound to form the quaternary ammonium salt.

Japan Patent Disclosure 56-13174 is directed to binders for anionically charged glass fibers. The binders are quaternary functional latexes.

U.S. Pat. No. 4,399,254 is directed to cationic lattices useful for thermoplastic and thermosetting applications. The invention relates to the use of cationic surfactants wherein the gegenion for the surfactant is derived from methane sulfonic acid. The patent discloses the use of these lattices for the manufacture of paper, textiles, adhesives and the like where adhesion to anionic substrates is required.

Japan Patent Disclosures 59-155413 and 60-32860 disclose cationic, amine functional dispersions made in water-solvent solutions as solution polymers. They are converted into dispersions by neutralization with acids such a formic, acetic or hydrochloric acid. they also contain grafted polyethylene oxides as stearic stabilizers. Pigmented coatings made by dispersing the pigments directly in the polymeric cationic dispersion are disclosed as providing good adhesion to anionic substrates such as for example alkyds, asphalt block, PVC, concrete, ceramic tile and glass.

Other references disclosing polymeric coatings for adhesion to various substrates include U.S. Pat. No. 4,7610,526; Japan Patent Disclosures 52-6748; 58-23969; 57-63366 and 62-187702.

U.S. Pat. No. 4,710,526 is directed to cement admixtures containing an aqueous emulsion of an alkaline-curable polymer which has excellent adhesion flexibility and waterproofing properties. The cement may be used as a paint. The polymer comprises from about 25 to 99.5 percent of a hydrolytically stable acrylate, from 0.5 to 15% of an alkaline-curable cationic quaternary ammonium salt monomer and other optional ingredients. The '526 patent discloses the use of all conventional types of surfactants with a preference for nonionic or cationic surfactants.

Japan Patent Disclosure 52-6748 is directed to an aqueous dispersion of an olefin polymer, organic solvent, high molecular weight water soluble compound and a nitrogen containing ring compound, tertiary amine or caprolactan. The dispersion is prepared without the use of an emulsifying surfactant. This is disclosed as being beneficial for the water resistance and bonding of the product.

Japan Patent Disclosure 58-23969 is directed to a soft finishing agent for textiles composed of a cationic emulsion of a polymeric quaternary ammonium salt.

Japan Patent Disclosure 57-63366 is directed to a method of electrodepositing a paint composed of a copolymer formed from dimethyl aminoethyl methacrylate, acrylic acid alkylesters, alpha beta monoethylenically unsaturated N-alkoxy methylated or N-methylolated monomers of carboxylic acid anhydride and optionally with other alpha beta monoethylenic unsaturated monomers. Acid is used as a neutralizing agent and water as a diluent. The dimethylaminoethyl methacrylate is disclosed as being essential to obtain adhesion with an alkyd melamine resin or acryl melamine resin paint which is subsequently applied over the above copolymer. Diethyl amino(meth)acrylate, dibutyl aminoethyl (meth)acrylate or their reaction products with primary or secondary amine type copolymers are disclosed as having inferior bonding properties with the overcoated paint coating as compared with the dimethylamino ethylmethacrylate copolymer of the invention. Any organic acid including formic acid, acetic acid, propionic acid and lactic acid are disclosed as being useful to neutralize the amino group of the dimethylamino ethyl methacrylate in the copolymer.

Japan Patent Disclosure 62-187702 is directed to a cationic emulsion formed by adding a polymerizable quaternary ammonium salt to an emulsion polymerization system containing a vinyl monomer for adhesion to negatively charged objects.

Since most water soluble staining agents are anionic, they can be effectively complexed, in an ion exchange content, with cationic materials to render the staining agents insoluble, such as for example by trapping them in the primer coat when it dries, such that the stains are prevented from migrating into water based topcoats.

U.S. Pat. No. 3,847,857 discusses this concept in more detail. The patent discloses two types of polymer dispersions which can entrap and insolubilize stains. The less preferred polymer type (Type 11) can be employed as a binder. This material is prepared as a copolymeric dispersion of non-crosslinked to slightly crosslinked, thermoplastic, film forming spherical particles of from 0.1 to 1 micron in diameter formed from a mixture of from 5 to 70 weight percent of one or more monomers containing an amine or quaternary ammonium group in salt from, from 0 to 50 weight percent of one or more polyethylenically unsaturated crosslinking monomers, and 0 to 89 weight percent of one or more monethylenically unsaturated monomers of neutral or nonionic characteristics, the counter ion of the salt being a metal counter ion in water such as those derived from boron, chromium, molybdenum and tungsten.

These polymers may be made by anionic, cationic, or non-ionic type surfactant. The polymerization can be carded out under neutral, acidic or alkaline conditions. After emulsion polymerization, the pH of the dispersion may be adjusted to whatever condition of neutrality, acidity or alkalinity is desired, the pigment may be dispersed using water soluble and swellable colloidal bodying agents and an auxiliary surfactant to stabilize the dispersion. This auxiliary surfactant may be a non-ionic, anionic or cationic surfactant. The '857 patent does not suggest that any particular type of surfactant is important; nor does it suggest any importance to the selection of the neutralizing acid type, pH, pigment dispersant type on the adhesion of coating containing the polymers. The coating composition of the present invention is an improvement to the materials of the '857 patent.

It is an object of the present invention to provide a stable, aqueous, cationic coating composition which exhibits improved performance over conventional anionic latex coatings, and is competitive in performance with organic solvent based alkyd primers for application to anionic substrates.

It is a further object of the invention to prepare an all cationic aqueous coating composition containing a cationic latex polymeric binder and a cationic pigment dispersant which does not compete with the cationic latex polymer binder for anionic binding sites on the substrate.

SUMMARY OF THE INVENTION

We have discovered a cationic latex coating composition which provides maximum adhesion to anionic substrates. The performance advantages of the coating composition were achieved through the selection of certain surfactants and acids to respectively prepare and neutralize the polymeric binder, as well as the type of dispersants and pigments used for preparing stable, pigmented coating compositions containing the cationic latex polymer binder.

The coating composition contains an aqueous dispersion of a cationic latex polymer binder having an incorporated cationic functionality such as for example as provided by an acid protonated amine functional latex or a quaternary ammonium functionality. The polymeric binder is preferably prepared by an aqueous emulsion polymerization process using at least one nonionic or amphoteric surfactant, and where the polymer is subsequently neutralized or protonated by the addition of selected acids. We have been able to formulate stable, high pigment volume concentration ("PVC") coating compositions, containing the cationic latex polymeric binder, by selecting cationic pigment dispersants which do not interfere with the adhesion of the latex polymer binder to anionic surfaces.

Furthermore, by the selection of certain process conditions and pigments, we have been able to formulate completely cationic aqueous coating compositions which exhibit excellent stain blocking, corrosion resistance, water sensitivity resistance and adhesion to wood and alkyd surfaces, and which are competitive in their performance with conventional solvent based alkyd primers and paints while maintaining the advantages of a water-based system.

DESCRIPTION OF THE DRAWING

FIG. 1 shows the degree of dissociation for alkyd carboxyl groups and latex amine groups as a function of pH.

DETAILED DESCRIPTION OF THE INVENTION

Cationic Latex Polymeric Binder

The cationic latex coating composition of the invention contains an aqueous dispersion of cationic latex polymeric binder particles. The cationic polymer particles may be prepared by any polymerization technique known in the art, such as for example suspension polymerization, interfacial polymerization or emulsion polymerization, from at least one monoethylenically unsaturated monomer, or mixtures of such monomers, provided that at least one of said monomers has a weak base or quaternary ammonium functionality or is capable of being imparted with such functionality. The ability of such a polymer to be imparted with such functionality is described in more detail hereinafter.

Emulsion polymerization of ethylenically unsaturated monomers in the presence of certain surfactants is the preferred polymerization technique because the aqueous dispersion of latex polymer particles so formed in this process can be used directly or with minimal work-up in preparing the aqueous coating composition of the present invention.

Emulsion techniques for preparing aqueous dispersions of latex polymeric particles from ethylenically unsaturated monomers are well known in the polymer art. Single and multiple shot batch emulsion processes can be used, as well as continuous emulsion polymerization processes. In addition, if desired, a monomer mixture can be prepared and added gradually to the polymerization vessel. Similarly, the monomer composition within the polymerization vessel can be varied during the course of the polymerization, such as by altering the composition of the monomer being fed into the polymerization vessel. Both single and multiple stage polymerization techniques can be used. The latex polymer particles can be prepared using a seed polymer emulsion to control the number of particles produced by the emulsion polymerization as is known in the art. The particle size of the latex polymer particles can be controlled by adjusting the initial surfactant charge as is known in the art.

A polymerization initiator can be used in carrying out the polymerization of the cationic polymer particles. Examples of polymerization initiators which can be employed include polymerization initiators which thermally decompose at the polymerization temperature to generate free radicals. Examples include both water-soluble and waterinsoluble species. Examples of free radical-generating initiators which can be used include persulfates, such as ammonium or alkali metal (potassium, sodium or lithium) persulfate; azo compounds such as 2,2'-azo-bis(isobutyro-nitrile), 2,2'-bis(2,4-dimethylvaleronitrile), and 1-t-butyl hydroperoxide and cumene hydroperoxide; peroxides such as benzoyl peroxide, caprylyl peroxide, di-t-butyl peroxide, ethyl 3,3'-di(t-butylperoxy) butyrate, ethyl 3,3'-di(t-amylperoxy)butyrate, t-amylperoxy-2-ethyl heanoate, and t-butylperoxy pivilate; peresters such as t-butyl peracetate, t-butyl perphthalate, and t-butyl perbanzoate; as well as percarbonates, such as di(1-cyano-1 -methylethyl)peroxy dicarbonate; perphosphates, and the like.

Polymerization initiators can be used alone or as the oxidizing component of a redox system, which also includes a reducing component such as ascorbic acid, maleic acid, glycolic acid, oxalic acid, lactic acid, thiogycolic acid, or alkali metal sulfite, more specifically hydrosulfite, hyposulfite or metbisulfite, such as sodium hydrosulfite, potassium hyposulfite and potassium metabisufite, or sodium formaldehyde sulfoxylate. The reducing component is frequently referred to as an accelerator.

The initiator and accelerator, commonly referred to as catalyst, catalyst system or redox system, can be used in concentrations of from about 0.001% to 5% each, based on the weight of monomers to be copolymerized. Accelerators such as chloride and sulfate salts of cobalt, iron, nickel, or copper can be used in small amounts. Examples of redox catalyst systems include tert-butyl hydroperoxide/sodium formaldehyde sulfoxylate/-Fe(II), and ammonium persulfate/sodium bisulfite/-sodium hydrosulfite/Fe(II). The polymerization temperature can be from room temperature to about 90° C., and can be optimized for the catalyst system employed, as is conventional.

Chain transfer agents can be used to control polymer molecular weight, if desired,. Examples of chain transfer agents include mercaptans, polymercaptans and polyhalogen compounds. Examples of chain transfer agents which may be used include alkyl mercaptans such as ethyl mercaptan, n-propyl mercaptan, n-butyl mercaptan, isobutyl mercaptan, t-butyl mercaptan, n-amyl mercaptan, isoamyl mercaptan, t-amyl mercaptan, n-hexyl mercaptan, cyclohexyl mercaptan, n-octyl mercaptan, n-decyl mercaptan, n-dodecyl mercaptan; alcohols such as isopropanol, isobutanol, lauryl alcohol, t-octyl alcohol, benzyl alcohol, and alpha-methylbenzyl alcohol; halogenated compounds such as carbon tetrachloride, tetrachloroethylene, and trichlorobromethane. Generally from 0 to 10% chain transfer agent by weight, based on the weight of the monomer mixture, can be used. The polymer molecular weight can be controlled by other techniques known in the art, such as by selecting the ratio of initiator to monomer.

Cataylst and/or chain transfer agent can be dissolved or dispersed in separate or the same fluid medium, can be added simultaneously with the catalyst and/or the chain transfer agent. Amounts of initiator or catalyst can be added to the polymerization mixture after polymerization has been substantially completed to polymerize the residual monomer as is well known in the polymerization art.

Aggregation of the latex polymer particles can be discouraged by inclusion of a micelle-forming, stabilizing surfactant in the polymerization mix. In general, the growing core particles are stabilized during emulsion polymerization by one or more surfactants, at least one of said surfactants being a nonionic or amphoteric surfactant or mixtures thereof. These types of surfactants are well known in the emulsion polymerization art. Many examples of suitable surfactants are given in *McCutchen's Detergents and Emulsifiers* (MC Publishing Co., Glen Rock, N.J.), published annually. Other types of stabilizing agents, such as protective colloids, can also be used.

Preferably, in the preparation of the cationic polymer latex binder the proportion of any anionic or cationic surfactant should be minimized relative to the concentration of the nonionic and amphoteric surfactants used, so that the addition of the aqueous dispersion of the cationic latex polymer particles contributes minimal anionic or cationic surfactant to the coating composition, and minimizes interference with the adhesion of the coating to anionic substrates. Cationic surfactants at concentrations below about 1 percent by weight on polymer latex may be tolerated, but concentrations of such surfactants of about 1 percent on latex and higher, depending on the structure of the surfactant, may significantly compromise adhesion by competing with the cationic latex for anionic binding sites on the substrate. Anionic surfactants are also undesirable in that they will complex with the cationic latex sites. It is preferred that the concentration of anionic surfactant on a molar basis be less than 50% of the molar amount of weak base or quat functionality. As indicated above it is most desirable to use nonionic and amphoteric surfactants. A mixture of the two being the most preferred for the best balance of properties. The amphoteric surfactants are desirable in that they act to improve corrosion resistance as taught by U.S. Pat. Nos. 2,926,108 and 3,336,229.

Examples of suitable anionic surfactants include the ammonium, alkali metal, alkaline earth metal, and lower alkyl quaternary ammonium softs of: sulfosuccinates such as di($C_7$–$C_{25}$) alkylsulfosuccinate; sulfates such as the higher fatty alcohol sulfates, for example, lauryl sulfate; sulfonates including aryl sulfonates, alkyl sulfonates, and the alkylaryl sulfonates, for example, isopropylbenzene sulfonate, isopropylnaphthalene sulfonate and N-methyl-N-palmitoyltaurate, isothionates such as oleyl isothionate; and the like. Additional examples include the alkylarylpoly(ethyleneoxy) ethylene sulfates, sulfonates and phosphates, such as t-octylphenoxypoly(ethylenoxy)ethylene sulfates and nonylphonoxypoly(ethyleneoxy)ethylene phosphates, either having 1 to 7 oxyethylene units.

Examples of suitable nonionic surfactants include poly(oxyalkylene) alkyphenol ethers, poly(oxyalkylene) alkyl ethers, poly(oxyalkylene) esters of fatty acids, polyethyleneoxidepolypropyleneoxide block copolymers, and the like.

Examples for suitable cationic surfactants include quaternary alkyl ammonium halides, phosphates, acetates, nitrates, sulfates; polyoxyalkyleneamines, poly(ethyleneoxide)amine, polyoxyalkylamine oxides, substituted imidazoline of alkyl fatty acids, alkylbenzyldimethylammonium halides, and alkyl pyridinium halides.

Examples for suitable amphoteric surfactants include imidiazolinederived amphotefics, as shown below, in various anionic forms:

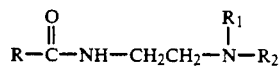

Where R is selected from the group consisting of straight and branched chain fatty acids and where the alkylene group has 8 to 20 carbon atoms;

R1 is selected from: $-((CH_2)_xO)_y-R'$ where $x=2$ and 3, $y=0$ to 6, $R'=H$, straight and branched chain fatty acids, and alcohols having 2 to 12 carbon atoms; and where $R_2$ is selected from the group consisting of branched, straight chain aliphatic and aromatic carboxylic acids, sulfonic acids, phosphoric acids where the alkylene group has 1 to 18 carbon atoms.

Also:

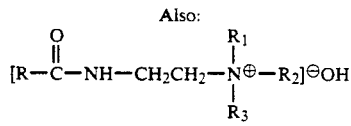

where R, $R_1$ and $R_2$ are the same as above, $R_3$ is selected from the group consisting of H, an alkyl or a alkenyl group containing 2 to 4 carbon atoms, and straight and branched chain monocarboxylic acids having a total of 1 to 12 carbon atoms. Other carboxybetaines, sulfatobetaines, sulfitobetaines, sulfobetaines, phosphoniobetaines, N-alkylamino acids and the like are also suitable.

In emulsion polymerization an aqueous polymerization medium is employed. The aqueous medium includes water and can include soluble inorganic salts, nonreactive water-miscible cosolvents such as lower alkanols and polyols, buffering agents, soluble and dispersible polymeric materials including protective colloids, and thickening and suspending agents such as polyvinyl alcohol, methoxycellulose, and hydroxyethylcellulose.

The cationic functional polymer particles of the present invention are polymerized from one or more monomers, including at least one polymerizable ethylenically unsaturated monomer, wherein at least one of said monomers contains a cationic functional group such as, for example, an acid protonated amine functional group or a quaternary ammonium functionality or is capable of being modified, after it is polymerized, to contain a cationic functional group such as, for example, an acid protonated amine functional group or a quaternary ammonium functionality. The monomer can be a single weak cationic-functional, polymerizable ethylenically unsaturated monomer species, or a precursor of such a species, such as a polymerizable ethylenically unsaturated monomer which can be modified after polymerization to provide the necessary cationic functionality. These monomers shall be reforred to hereinafter collectively as "cationic functional monomers". Alternatively, a monomer mixture which includes one or more polymerizable ethylenically unsaturated monomer species, or a precursor of such a species, may be employed, and shall also be considered within the above definition of cationic functional monomers.

The concentration of the cationic functional monomer preferably ranges from about 0.5 to 15 percent by weight of the total polymerizable monomers used to prepare the polymeric binder, and more preferably from about 1 to 5 percent by weight.

Examples of suitable cationic functional monomers include monoethylenically unsaturated monomers containing the group $-HC{=}C-$ and a weak-base amino group or radicals, and polyethylenic amines which polymerize monoethyenically, such as weak-base amine substituted butatriene. The properties of basic monomers, including alkenyl pyridines and alkylamino (meth)acrylates are reviewed by L. S. Luskin in *Functional Monomers*, Volume 2 (R. H. Yocum and E. B. Nyquist, eds., Marcel Dekker, Inc. New York 1974) at 555-739.

Examples of amine-functional monethylenically unsaturated monomers include those monomers having the structure of one of structural Formulas I and II as described hereinafter.

A first class of amine-functional, ethylenically unsaturated monomers can be represented by:

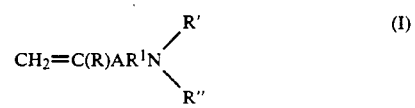

where:
R is selected from the group consisting of H, $CH_3$, and $C_2H_5$;

A is selected from the group consisting of $-O-$, $-S-$, $-CO_2-$, and $-C(O)NR^2-$; in which $R^2$ is selected from the group consisting of H and saturated aliphatic hydrocarbyl groups having 1 to 12 carbon atoms, $R^1$ is selected from the group consisting of straight and branched chain alkylene groups having 2 to 10 carbon atoms, of which at least two extend in a chain between the adjoined N atom and A group, R', when not directly connected to R", is selected from the group consisting of H, hydroxyalkyl groups containing 2 to 4 carbon atoms, and saturated aliphatic hydrocarbon groups having 1 to 10 carbon atoms, R", when not directly connected to R', is selected from the group consisting of H, hydroxyalkyl groups containing 2 to 4 carbon atoms, and saturated aliphatic hydrocarbon groups having 1 to 10 carbon atoms, R' and R", when directly connected together, form with the N atom a residue of a heterocyclic nucleus selected from the group consisting of morpholine, piperazine, pyridine, pyrrolidine, and N-alkyl-piperazine in which the alkyl group has 1 to 18 carbon atoms, such as methyl, ethyl, isopropyl.

Examples of the compounds of Formula I include:
10-aminodecyl vinyl ether
9-aminooctyl vinyl ether
6-(diethylamino)hexyl (meth)acrylate
2-(dethylamino)ethyl vinyl ether
5-aminopentyl vinyl ether
3-aminopropyl vinyl ether
2-aminoethyl vinyl ether
2-aminobutyl vinyl other
4-aminobutyl vinyl ether
3-(dimethylamino)propyl (meth)acrylate
2-(dimethylamino)ethyl vinyl ether
N-(3,5,5-trimethylhexyl)aminoethyl vinyl other
N-cyclohexylaminoethyl vinyl ether
3-(t-butylamino)propyl (meth)acrylate
2-(1,1,3,3-tetramethylbutylamino)ethyl (meth)acrylate
N-t-butylaminoethyl vinyl ether
N-methylaminoethyl vinyl ether
N-2-ethylhexylaminoethyl vinyl ether
N-t-octylaminoethyl vinyl ether
beta-morpholinoethyl (meth)acrylate
4-(beta-acryloxyethyl) pyridine
beta-pyrrolidinoethyl vinyl ether
5-aminopentyl vinyl sulfide,
beta-hydroxyethylaminoothyl vinyl ether,
(N-beta-hydroxyethyl-N-methyl) aminoethyl vinyl ether
hydroxyethyidimethyl (vinyloxyethyl) ammonium hydroxide
2-(diemthylamino)ethyl (meth)acrylate
2-(dimethylamino)ethyl (meth)acrylamide,
2-(t-butylamino)ethyl (meth)acrylate,
3-(dimethylamino)propyl (meth)acrylamide,
2-(diethylamino)ethyl (meth)acrylate,
2-(dimethylamino)ethyl (meth)acrylamide A second class of amine-functional, ethylenically unsaturated monomers can be represented by:

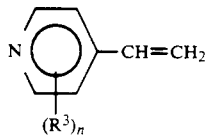

(II)

where:
R$^3$ is selected from the group consisting of H and saturated aliphatic hydrocarbon groups having 1 to 12 carbon atoms, and
n is an integer having a value of 1 to 4.

Examples of amine-functional ethylenically unsaturated monomers of Formula 11 include:
4-vinyl pyridine2,6-diethyl-4-vinyl pyridine
3-dodecyl-4-vinyl pyridine, and
2,3,5,6,-tetramethyl-4-vinyl pyridine.

As used herein, the expression "(meth)acrylate" is intended as a generic term embracing both acrylic acid and methacrylic acid esters. Similarly, "(meth)acrylamide" embraces both the mothacrylamides and acrylamides.

The quaternized form of weak base functional monomers, such those weak base functional monomers which have been reacted with alkyl halides, such as for example benzyl chloride and the like, or with epoxides, such as propylene oxide and the like, or with dialkyl sulfates, such as dimethyl sulfate and the like, can also be used. For the purpose of this invention such monomers shall be included within the description "cationic functional" monomers. This alkylation reaction is particularly necessary for weak base amine monomers that are significantly weaker in base strength than dimethyl aminopropyl methacrylamide (DMAPMA).

Some quaternized forms of weak base monomers are very water soluble and may be difficult to incorporate into latex polymers by emulsion polymerization. An alternate method of making a quaternary amine functional latex dispersion is to post-functionalize a latex after emulsion polymerization. This can be done as described in U.S. Pat. No. 3,926,890 where haloalkyl ester monomers such as for example 2-chloroethyl acrylate and the like, are incorporated into a latex. These latexes are then post-alkylated by reaction with tertiary amines. Alternately, latexes can be made with glycidyl monomers like glycidyl methacrylate and post reacted with amines (tertiary amines to form quaternary groups) as taught in U.S. Pat. No. 3,969,296.

Additionally, weak base functional latexes can also be postreacted with alkylating agents such as, for example, benzyl chloride, epoxides as discussed above for monomers.

Instead of preparing the cationic functional polymer particles by polymerization of monomer including a cationic functional group, the particles can be prepared by first polymerizing one or more monomers which do not include weak base-functional groups, and then functionalizing the polymer with an agent which provides a weak base-functional group.

In addition to the weak base-functional monomer, other ethylenically unsaturated monomers which are polymerizable with the weak base functional monomer can also be used in preparing the cationic latex polymer particles of the present invention. For example, copolymerizable ethylenically unsaturated nonionic monomers can be employed. Examples of nonionic monoethyenically unsaturated monomers which can be used include styrene, alpha-methyl styrene, vinyl toluene, vinyl naphthalene, ethylene, vinyl acetate, vinyl versatate, vinyl chloride, vinylidene chloride, acrylonitrile, methacrylonitrile, (meth)acrylamide, various (C$_1$-C$_{20}$)alkyl and (C$_3$-C$_{20}$)alkenyl esters of (meth)acrylic acid; for example, methyl (meth)acrylate, ethyl (meth)acrylate, n-butyl (meth)acrylate, isobutyl (meth)acrylate, 2-ethylhexyl (meth)acrylate, cyclohexyl (meth)acrylate, n-octyl (meth)acrylate, n-decyl (meth)acrylate, n-dodecyl (meth)acrylate, tetradecyl (meth)acrylate, n-amyl (meth)acrylate, neopentyl (meth)acrylate, cyclopentyl (meth)acrylate, lauryl (meth)acrylate, oleyl (meth)acrylate, palmityl (meth)acrylate, and stearyl (meth)acrylate; other (meth)acrylates such as isobornyl (meth)acrylate, benzyl (meth)acrylate, phenyl (meth)acrylate, 2-bromethyl (meth)acrylate, 2-phenylethyl (meth)acrylate, and 1 -naphthyl (meth)acrylate; alkoxyalkyl (meth)acrylates such as ethoxyethyl (meth)acrylate; and dialkyl esters of ethylenically unsaturated di- and tricarboxylic acids and anhydrides, such as diethyl maleate, dimethyl fumarate, trimethyl aconitate, and ethyl methyl itaconate.

The ethylenically unsaturated monomer can also include up to 10% at least one multiethylenically unsaturated monomer to raise the average molecular weight and to crosslink the polymer. Examples of multiethylenically unsaturated monomers which can be used include allyl (meth)acrylate, tripropyleneglycol di(meth)acrylate, diethyleneglycol di(meth)acrylate, ethyleneglycol di(meth)acrylate, 1,6-hexanediol di(meth)acrylate, 1,3-butyleneglycol di(meth)acrylate, polyalkylene glycol di(meth)-acrylate, diallyl phthalate, trimethylolpropane tri(meth)acrylate, divinyl benzene, divinyl toluene, trivinyl benzene and divinyl naphthalene. Nonionic monomers including functional groups which can serve as sites for post-polymerization crosslinking can be included in lieu of or in addition to multi-ethylenically unsaturated monomer. For example, epoxy-functional ethylenically unsaturated monomers, such as glycidyl methacrylate, amine-functional ethylenically unsaturated monomers such as methyl acrylamidoglycolate methyl ether, and the like, can be employed. However, the polymerization conditions should be selected to minimize reaction, if any, between the cationic functional group and the post-polymerization crosslinkable functional group. After polymerization an appropriate multi-functional crosslinking agent can be reacted with crosslinkable functional groups pendant from the polymer chain. Altenatively, the cationic functional group itself can serve as crosslinking site. Other means of crosslinking the polymer particles known in the art, such as by high energy particles and radiation, can also be employed.

Protonation of amine functional polymer; pH, Base strength and acid selection

It is necessary to protonate the amine functional polymer particles to make the polymer particles cationic by the addition of one or more acids to the aqueous dispersion of amine functional polymer particles. The adhesion of such acid protonated amine functional polymer-containing coatings to anionic substrates is related to the pH of the aqueous dispersion of the polymer particles . The pH of the aqueous dispersion containing the polymer particles which results simultaneously in the maximum concentration of protonated amine groups on the polymeric binder and anionic groups on the substrate gives the maximum ionic interaction between the substrate and the coating and the maximum adhesion therebetween. Adhesion is at a maximum at the pH which yields an equal concentration of the two interacting species. For example, at low pHs such as, for example, at pH below 4 the concentration of carboxyl groups present in the ionized form on an alkyd surface is low. At high pH such as, for example, at pH above 8 the concentration of amine groups in the protonated state on the latex surface will be low. The pH range of maximum adhesion of the polymer onto anionic substrates occurs when the number of substrate carboxyl groups in the ionized carboxylate form is equal to polymeric binder protonated amine groups at the interface between the two. If very few carboxyl groups are present, the pH of maximum adhesion will be shifted to a higher pH than for the case of equal concentrations of carboxyl and amine functional groups hereinafter referred to as "maximum ionic bonding". If high concentrations of both interacting species are present at the coating substrate interface, by practical methods of measuring adhesion, adhesion may be maximized, without a high dependence on pH.

We have observed that the pH range where the maximum ionic bonding (MIB) of the polymeric latex binder on anionic substrates occurs depends on the base strength of the amine functional latex. The stronger the base strength of the polymer, the broader the pH range where MIB and good adhesion is observed. As the base strength of the amine functional polymer increases, the pH of maximum adhesion will shift to correspondingly higher pH values. In general the pH of the aqueous dispersion of cationic polymer particles should never be raised above pH 9 and should never be below pH 2, and preferably should in the range of 5 to 8.

Quaternary ammonium functional latexes have been observed to have the widest pH- adhesion range. This is believed to be due to the quaternary ammonium functionality providing a pH independent level of cationic charge.

For the ionic bonding mechanism discussed above, the amine functional groups in the polymer may be primary, secondary, tertiary, or quaternary amines The chemical type is not important, only their base strength is of importance. MIB may also be achieved at higher pH if the concentration of the amine functional monomer is increased.

As disclosed in Japan Patent Disclosure 60-32860 tertiary amine functionality is desired over secondary amines because secondary amines cause coloration problems and are too hydrophilic.

Certain acids which could be used to protonate the amine functional polymer particles can compromise the adhesion of the polymer, as well as coatings containing the polymeric binder, to anionic substrates. In particular, acids which are strongly selectivity for amine functional resins ("selective" having the meaning used in ion exchange resin technology context) must not be used in coatings to neutralize or protonate the amine functional latex, or as the counterion for the dispersants used in the coating composition. Particularly, aromatic sulfonic acids, hydrophobic acids such as for example oleic, octanoic, and the like., and polyvalent acids such as citric acid and the like, should be avoided. Acids which have a strong selectivity for amine groups on the amine functional latexes will complex these amine groups making them unavailable for interacting with anionic substrates. Besides hurting adhesion, these acids also greatly increase the pigment grind viscosity in pigmented coating compositions, containing the cationic latex polymer binder, and require additional water in the grind to achieve reasonable viscosity which is undesirable. They also reduce the efficiency of cationic, amine- based dispersants.

The most desirable acids which we have found for the neutralization or protonation of the amine functional polymeric binder particles are monopretic, organic acids such as for example acetic acid, lactic acid, and the like. Inorganic acids such as, for example, hydrochloric acid may also be used, but they generally hurt the water resistance and the corrosion resistance of the coatings. The significant factors in determining the selectivity of acid used for partially protonating amine functional polymers includes the valence of the acid anion, the ionic radius of the acid molecule, the relative strength of the acid and the molecular structure or geometry of the acid molecule as taught in *Doulite Ion-Exchange Manual*, edited by technical staff of the Resinuos Products Division of Diamond Shamrock Company, Copyright 1969, Diamond Shamrock Corp. Hydrophobic acids, such as for example oleic acid, tend to form insoluble liposalts with hydrophobic amines, such as for example, the amine functional polymeric binder particies. We have found a preference, therefore, for $C_1$-$C_6$ monocarboxylic acids, formic, acetic acid, propionic, lactic acid and other lower Mw organic acids.

Cationic Pigment Dispersants

We have also found that in making coatings that are completely cationic, cationic dispersing agents should be used to disperse the pigment particles. Anionic dispersing agents put a large negative charge on pigment particles, and when a pigment dispersion made with an anionic dispersant is added to the cationic polymeric binder, significant undesirable flocculation occurs. Nonionic pigment dispersants may be used, but have been found to be inefficient. In addition, most pigments and extenders are above their isoelectric point at the pH range desired by amine functional polymeric binders and require a cationic dispersing agent to give them a positive surface charge. Of particular interest are cationic dispersants that are extremely efficient in selectively attaching to pigment particles so that little remains available to interfere with the adhesion of the binder as for example by interacting with anionic binding sites on the substrate surface. Those cationic dispersants which strongly adsorb or chemically attach to pigment surfaces are therefore preferred. Amine functional silanes have been found to have both of these particularly desirable features. They are efficient, and strongly partition to pigment and extender surfaces through interactions provided by their silanol groups (Si—OH); which silanol groups are formed when the silane groups contact water and are hydrolyzed to silanol groups (Si—OH). In addition to self condensation reactions, silanes can alternatively form Si—O-Metal bonds with pigments and extenders that contain M-OH surface groups.

We have found that the concentration of silane dispersants in the range of 0.05-1.5% based on pigment and extender solids. Other amine functional silane dispersing systems that are useful include any of the commercial amine silanes which can be mixed with common nonfunctional silanes like methylthmethoxysilanes. Silane monomers like 3-methacryloxypropyl trimethoxysilane can be polymerized with the amine functional monomers such as for example DMAPMA. Polyamines such as for example Primafloc ® C-3 (PVI; Rohm and Haas Co.) can be modified with reactive silanes that contain epoxy groups to attach silane functionality to an amine functional material in order to have both cationic functionality (protonated amine or quaternary amine) together with silane functionality in the same molecule in a form which produces a stable water soluble material until reactive substrates like pigment surfaces are encountered.

In practice, the amount of dispersant needed to produce stable paints and fluid pigment dispersions depends on the type of dispersant and the dispersant demand of the pigments and extenders that are used. Preferably the dispersant concentration is in the range of 0.05 to 1.5% by weight based on the weight of pigment and extender in a formulation.

Pigments and Extenders

Primers are pigmented coatings which provide coverage and hiding of a painted substrate. Ideally, only one topcoat of paint should be needed to be applied over a primer to give complete coverage. The primer, in addition to hiding the substrate also provides protection to the substrate from external agencies such as, for example, light.

Pigment and extender concentration is referred to in terms of the pigment volume concentration ("PVC"). The definition of PVC is (pigment volume)/(pigment+binder+other solids volume). There are limitations on the practical range of PVC for a primer coating. If the PVC is too high, flexibility, crack resistance and stain blocking properties will be poor. If the PVC is too low, hiding will be poor and coating cost will be high. For special sealing applications "clears" or 0% PVC coatings are sometimes used, but this is the exception and not the rule. Typically primers are formulated in the 18 to 45 PVC range, and more preferably in the 20 to 40 PVC range. Low PVC coatings are used where stain blocking and corrosion resistance are of the utmost importance. High PVC coatings are used where hiding and cost are the primary consideration.

With the cationic coatings of the invention containing the cationic functional latex binders certain pigments and extenders are preferred. Since the pH of the coating should be slightly acidic to neutral, high levels of materials that buffer to high pH and have a high buffer capacity should be avoided. This includes such materials such as zinc oxide, calcium carbonate, some silicates, barium metaborate, and the like . Preferred extenders are low basicity materials like silica, clays, hydrated alumina, barium sulfate, and the like.

Any colored pigmentation can be used provided it does not buffer to high pH or have a high buffer capacity. Useful pigments include titanium dioxide, iron oxides, and the like. Cationically based coatings have some advantages with regard to pigmentation, over anionic coatings in that they can effectively incorporate certain reactive pigments which cause stability problems in conventional anionic latex paints. These reactive pigments are materials which contain polyvalent metal ions, such as for example aluminum triphosphate reactive pigments (K-White, Teikoku Kato Co., Japan), or specialty materials like ground strong base ion exchange resins. K-White pigments are modified aluminum tripolyphosphate pigments. K-White reactive pigments are useful in preventing flash rusting, improving general corrosion resistance, and we have found that they improve stain blocking properties when used in cationic paints. It is well recognized in the art that polyvalent metal ions can improve stain blocking properties in that they complex and precipitate out staining agents. For example, *Polymers Paint Color Journal*, vol. 178 no. 4216, p. 471 (1988) discusses how Al (III) ions inhibit tannin wood staining, and Bilek, J. J., *Paint Technology*, 39 (508), 328 (1967) discusses the use of lead pigments. K-White reactive pigments cannot be used with typical, high pH anionic paints due to the stability problems they cause. The use of K-White pigments is mainly in solvent based paint and water dispersed alkyd based paint. Using K-White pigments in a cationic latex is a unique approach which avoids the intractable stability problems encountered with standard anionic binders.

Other pigments which are generally not used in anionic latex paints because of incompatibility problems are aluminum powders and flake as well as cupric or cuprous oxide antifouling pigments. The special grades of Aluminum powder that are designed for use in aqueous systems (Stapa Hydrolac, manufactured by Eckart-Werke, Germany) preferably at pH's near 7 which is ideal for the cationic latex based paints of the present invention. Copper based pigments cause discoloration and viscosity stability problems in anionic latex paints due to the use of ammonia and other neutralizing amines in anionic paint which solubilize copper. These problems do not occur when copper oxide pigments are used in paints based on cationic latex binders. One advantage of cationic latex paints in general over anionic latex paints is that they can be used to paint over copper and brass materials without causing paint discoloration.

Paint Additives

Paints based on the cationic latex binders can be formulated with many of the same well known additives commonly used with anionic latex paints. For example, glycols can be added to provide freeze thaw stability and promote open time; coalescent solvents can be added to enhance film formation; defoamers, wetting agents, and biocides may also be used.

It is preferred that thickeners of the nonionic type be used to thicken cationic latex based paints. Cationic polymeric thickeners can be used, but these generally hurt water resistance and can compromise adhesion in much the same way as polymeric cationic dispersants. Of the nonionic thickeners, of particular use are the urethane based associative thickeners. These materials promote flow and paint film uniformity which improves paint properties in general.

The following examples are presented to illustrate the preparation, compositions, methods of using and performance properties of the cationic latex polymer binder and coatings of the invention. These examples are illustrative only and should not be construed as limiting the scope of the present invention.

The test methods used in the performance evaluations are described in more detail below.

Test Methods

1. Stain Blocking Over Cedar and Redwood

One coat of the test primer formulation was applied at 450 sq. ft/gal. to wood siding panels at 70% relative humidity and 78 degrees F. After drying overnight for about 16 hours the primer was topcoated with an exterior flat latex paint (example 9). The test areas were rated 72 hrs. later on a scale of 1 to 10, with 10 being the best, for how well the stains were blocked.

2. Stain Blocking on Interior Stains

Test substrates were prepared by applying felt pen, ball point pen, Crayola® water soluble children's markers, and crayons to wall board that was first painted with a commercial interior flat paint (MAB Walshield ® white). The stains were allowed to dry for one week before applying primers to test for stain blocking. Primers and topcoats were applied the same as in test method 1. The topcoat used was an interior flat, MAB Walshield ® being a typical example, of an interior flat paint. Kilz ® solvent based paint (Masterchem Industries) was used as a comparison paint along with Kilz ®II a anionic latex based primer.

3. Aged Alkyd Adhesion

Test paints were applied to old alkyd coated panels. Typically the boards were 1 to 4 years old. Aged alkyd is much more difficult to adhere to than new alkyd paint (1 to 3 months old). The test alkyd used was Forest Green high gloss alkyd from Duron Inc.

Test paints were applied at 250-300 sq. ft../gal., allowed to dry overnight for about 16 hours, and then placed in an artificial deionized water rain chamber for one hour before adhesion testing was performed. This is a very severe test designed to show differences in systems with very good adhesion.

Wet knife adhesion testing was done by cutting an X on the applied coating and trying to peel back the coating at the X mark. Additionally, sometimes testing was also done by the cross hatch method where a grid of 100 square was cut through a one square inch test area of the test paint after the one hour in the rain chamber. The test area was dried and Scotch brand 710 tape (3M Co.) was applied to the area rubbed on and pulled off at 90° degrees. The rating of 10 means all squares remain adhered to the alkyd. A rating of 1 means only 10% remained.

4. Wood Adhesion

Paint was applied to cedar and white pine siding at a spread rate of 450 sq. ft./gal. The paint was allowed to dry for one week before testing. Testing was done by putting the painted siding in an artificial rain chamber for one hour followed by wiping dry and applying the Scotch brand 710 tape followed by removing it from the paint at an angle of 90 degrees. The amount of paint remaining was rated on a scale of 1 to 10, 10 being the best.

5. Blistering over Chalky Acrylic Latex Paint

Two coats of test paint were applied to painted siding that was weathered outside and chalked to an ASTM. ASTM committee D-1, subcommittee D01.27 chalk rating of 5 to 6. Each coat was applied at 450 sq. ft/gal.; 3 hours was allowed between coats. After over night dry the painted panel was placed in the artificial rain chamber for 1 hour and rated for the level of blistering.

6. Nail Head Rust Resistance

New steel nails were driven into white pine. The nail heads and surrounding area were given two coats of primer and topcoated with Example 9. Three to four hours was allowed between coats. After overnight dry for the last coat, wet cheese cloth was placed on the test areas for 2 days, and the test areas were rated for rust bleed through on a 0 to 10 scale (10 no signs of rust).

7. Stability Testing

A. Heat age stability

Paints were placed in quarter pint paint cans and placed in 140° F. oven for ten days. Their Krebs viscosity was measured before and after heat aging. If viscosity did not increase more than 15 units: paints pass.

B. Roller Stability

Paints in quarter pint paint cans were placed on a roller mill, Norton Ball Mill Roller (200 rpm), for ten days. They were checked for viscosity increase as for heat aging.

EXAMPLE 1: Preparation of Cationic Latex Polymer Binder:

Into a 5-liter round-bottomed flask equipped with paddle stirrer, thermometer, nitrogen inlet and reflux condenser was added 1174 grams of deionized water and 29.7 of Triton X-405( nonionic surfactant; 70% active). This was stirred at 30° C. under a nitrogen atmosphere.

A monomer mixture was prepared by mixing in a second flask: 570 grams of deionized water, 131.4 grams of Triton X-405 (70% active), 986.6 grams of butyl acrylate (BA), and 915 grams of methyl methacrylate (MMA). 722.6 grams of this monomer mixture was removed to serve as the first stage monomer mixture, and 38.8 g of dimethylaminoethylmethacrylate(DMA-EMA) was then added to the remainder of the mixture to form the second stage monomer mixture. Three minutes after adding the first stage monomer mixture to the stirred, heated flask containing the deionized water and Triton X-405 surfactant; 0.88 g of 70% active t-butylhydroperoxide (TBHP), 20 ml of 0.1% aqueous $FeSO_4 \cdot 10H_2O$, 12.5 ml of 1% aqueous ethylene diamine tetraacetic acid sodium salt and 0.61 g of sodium sulfoxylate formaldehyde (SSF) were dissolved in 20 ml of deionized water and added to the flask containing the first monomer mixture. The reaction began within 2-3 minutes and the temperature of the reaction contents reached a peak temperature of 74°-76° C. Ten minutes after the peak temperature was reached, the of the second stage monomer mixture was added to the flask containing the first stage reaction product, at a rate of 17 g/min along with 11 g of TBHP (70% active) dissolved in 250 g of water and 7.6 g of SSF dissolved in 250 g of water at a rate of 2 ml/min while the temperature was maintained at 65° C. After two hours the addition of the second stage monomers and initiators was completed. After another 20 min, the dispersion was cooled to room temperature, and then filtered through a 100 mesh screen to remove any wet coagulum. The resulting dispersion has 46.8% solids, pH 6.6, and an average or particle size of 150 nm by Coulter Nanosizer.

EXAMPLE 2A to 2D: ADDITIONAL POLYMERIC LATEX BINDERS

The procedure of Example 1 was repeated using different amine monomers. These amine monomers are tertiary butylaminoethylmethacrylate (TBAEMA), and dimethylaminopropylmethacrylamide (DMAPMA). The quantity of monomers used as well as the resulting data are shown in Table I.

TABLE I

|  | 2A | 2B | 2C | 2D |
|---|---|---|---|---|
| BA | 986.6 g | 986.6 g | 986.6 g | 986.6 g |
| MMA | 905.3 g | 915.0 g | 934.4 g | 953.8 g |
| TBAEMA | 48.5 g | — | — | — |
| DMAPMA | — | 38.8 g | 19.4 g | — |
| % Solids | 46.5 | 46.3 | 46.6 | 46.5 |
| Particle Size (nm) | 140 | 120 | 130 | 120 |
| pH | 7.2 | 9.1 | 8.9 | 2.5 |

EXAMPLE 3A TO 3J: ADDITIONAL POLYMERIC LATEX BINDERS

The same procedure as Example 1 was repeated with modified compositions as shown in Table II.

TABLE II*

|  | BA | EA | MMA | DMAPMA | n-DDM | % Solids | P.S. (nm) |
|---|---|---|---|---|---|---|---|
| A | 1145 | — | 757 | 38.8 | 14.5 | 46.0 | 120 |
| B | 1145 | — | 757 | 38.8 | — | 46.0 | 130 |
| C | 1145 | — | 728 | 77.6 | 14.5 | 46.0 | 130 |
| D | 1067 | — | 835 | 37.8 | 14.5 | 46.2 | 135 |
| E | 1067 | — | 835 | 37.8 | — | 45.5 | 230 |
| F | 986 | — | 916 | 38.8 | 29 | 45.8 | 230 |
| G | 986 | — | 916 | 38.8 | 19.4 | 46.4 | 130 |
| H | 986 | — | 913 | 37.8 | 14.5 | 45.3 | 120 |
| I | — | 1455 | 447 | 37.8 | 14.5 | 45.6 | 130 |
| J | — | 1455 | 447 | 37.8 | — | 45.6 | 140 |

*BA: butyl acrylate
EA: ethyl acrylate
MMA: methyl methacrylate
DMAPMA: dimethylaminopropylmethacrylamide
n-DDM: n-dodecyl mercaptan
P.S.: particle size

EXAMPLE 4A to 4E: ADDITIONAL POLYMERIC LATEX BINDERS

The same procedure as Example 3E was repeated but with some modifications as shown in Table III.

TABLE III

|  | Surfactant | % Solids | pH | P.S. (nm) |
|---|---|---|---|---|
| A | Triton X-405 69 g (non-ionic) SLS (28%) 13.9 g (anionic) | 46.4 | 9.6 | 140 |
| B | Igepal CO-897 159 g (70% active non-ionic) | 47.0 | 9.0 | 130 |
| C | Igepal CM0880 77.6 g (100% active non-ionic) | 45.0 | 9.0 | 170 |
| D | Pluronic P-66 11.6 g (100% active non-ionic) | 46.0 | 9.0 | 155 |
| E | Triton X-405 83.1 g (non-ionic) Abex 1404 138.6 g (42% active amphoteric) | 46.2 | 9.2 | 140 |

EXAMPLE 5A and 5B: ADDITIONAL POLYMERIC LATEX BINDER SYNTHESIS

Example 5A

Into a 1-liter round-bottomed flask equipped with paddle stirrer, thermometer, nitrogen inlet and reflux condenser was added 215 grams(g) deionized water and 6.89 g of sodium lauryl sulfate (SLS, 28% active). This was stirred in the flask, and the flask was heated to 85° C. under nitrogen atmosphere. A monomer mixture was prepared in a separate vessel by mixing 48 g of deionized water, 1.03 g of SLS (28% active), 72.1 g of ethyl acrylate (EA), 64.7 g of methyl methacrylate (MMA) and 1.82 g of glacial methacrylic acid. Two minutes after adding 0.53 g of ammonium persulfate dissolved in 2.5 g of deionized water to the heated, stirred flask containing the deionized water and surfactant, the monomer mixture was added at the rate of 1.04 g/min. The reactor temperature containing the initiator and monomer mixture was maintained at 83°-85° C. until 20 minutes after the end of the addition of the monomer mixture feed. The reactor flask temperature was then cooled down to 40° C., and a 9.3 ammonium hydroxide (28% active) in 20 g of deionized water solution was added to the flask. The solids of the resulting polymer dispersion (5A) was about 33%.

EXAMPLE 5B

Into a 5-liter round-bottomed flask equipped with paddle stirrer, thermometer, nitrogen inlet and reflux condenser was added 931 grams(g) of deionized water. The water was stirred in the flask while the temperature of the flask contents was heated to 65° C. under nitrogen atmosphere. A monomer mixture was prepared separately by mixing in a vessel 504 g of deionized water, 70 g of Triton X-405 (70% active), 111 of Abex 1404 (42% active)(a mixture of non-ionic and amphoteric surfactant) 854 g of butyl acrylate (BA), and 668 g of methyl methacrylate (MMA). A 220 g of the above monomer mixture. 220 g of this monomer mixture was separated as the first monomer mixture and 30.2g of dimethylaminopropylmethacrylamide (DMAPMA) was then added to the remainder of the monomer mixture as the second stage monomer mixture. Two minutes after 110 g of polymer dispersion (5A) was pumped into the 5 L. flask containing 0.88 g of 70% active TBHP dissolved in 20 ml of deionized in 10 ml of water, 20 ml of 0.1% aqueous $FeSO_4 \cdot 10H_2O$, 12.5 ml of 1% aqueous ethylene diamine tetraacetic acid sodium salt and 0.61 g of sodium sulfoxylate formaldehyde (SSF) dissolved in 20 ml of deionized water were added to the flask. Two minutes after the addition of the initiators, the first stage monomer mixture was pumped into the flask at the rate of 9.5 g/min along with 8 g of TBHP (70% active) dissolved in 180 g of water and 5.5 g of SSF dissolved in 180 g of water at a rate of 0.84 ml/min, maintaining the temperature at 60° C. After the first stage monomer mixture was finished, the second stage monomer mixture was added at the rate of 12 g/min maintaining the same flask temperature. After the second stage monomer mixture feed was completed, the remaining co-feed initiators were continued to be added for an additional 20 minutes. The kettle was then cooled to room temperature and the dispersion was filtered through a 100 mesh screen to remove any wet coagulum. The resulting dispersion (5B) had 45.4% solids, and an average particle size of 160 nm by Coulter Nanosizer.

EXAMPLE 6A to 6B

The same procedures was repeated with the compositional modifications shown in Table IV.

TABLE IV*

|   | DMAEMA | TBAEMA | OXEMA | % SOLIDS | P.S. (nm) |
|---|---|---|---|---|---|
| A | 30.4 g | — | — | 45.4 | 160 |
| B | — | 30.4 g | — | 44.9 | 150 |
| C | — | — | 30.4 | 44.9 | 140 |

*DMAEMA Dimethylaminoethylmethacrylate
TBAEMA t-Butylaminoethylmethacrylate
OXEMA oxazolidinylethylmethacrylate

EXAMPLE 7A to 7E

The same procedure as Example 5B was repeated except the surfactants were modified as shown in Table V.

TABLE V

|   | Surfactant | % Solids | P.S. (nm) |
|---|---|---|---|
| A | Triton X-405 (70%) 67 g (non-ionic) Miranol CM-SF (38%) 41 g (amphoteric) | 44.8 | 150 |
| B | Triton X-405 (70%) 88.7 g Miropon FAS (38%) 41 g (amphoteric) | 45.6 | 140 |
| C | Emulphor EL-719 (97%) 64 g (non-ionic) Mirapon FAS (38%) 41 g (amphoteric) | 47.5 | 158 |
| D | Triton X-405 (70%) 88.7 g Deriphat 151C (49%) 36 g (amphoteric) | 45.1 | 150 |
| E | Triton X-405 (70%) 88.7 g Amphosol CG (30%) 51.9 g betaine (amphoteric) | 45.1 | 150 |

EXAMPLE 8

Into a 5 liter round-bottomed flask equipped with paddle stirrer, thermometer, nitrogen inlet and reflux condenser was added deionized water (1164 g) and Triton X-405 (29.7 g, 70% active). This was stirred at ambient temperature (18' C.) under nitrogen atmosphere. A monomer emulsion was prepared by mixing 570 g deionized water, 131.4 g Triton X-405 (70% active), 1067.2 g butyl acrylate (BA), and 835.3 g methyl methacrylate (MMA). A 722 g portion of the monomer emulsion was separated from the monomer emulsion so prepared and then charged to the flask, and 37.8 g dimethylaminoethylethylmethacrylate (DMAEMA) was then added to the remainder of the monomer emulsion. To flask was then added 20g of 0.1% aqueous ferrous sulfate, 12.5 g of 1% aqueous ethylendiaminetetraacetic acid sodium salt, 25 g of 3% aqueous t-butylhydroperoxide (TBHP), and 25 g of 3% aqueous sodium sulfoxylate formaldehyde (SSF). The flask was then heated to 40° C. and after 2-3 minutes the reaction started and reached a peak temperature of 60° C. after 10 minutes. Five minutes after reaching the peak temperature the kettle was heated and maintained at 60° C., and fifteen minutes after the peak the monomer emulsion was pumped into the flask at a rate of 13.3 g/min. Separate solutions of 225 g of 3% aqueous TBHP and 225 g of 3% aqueous SSF were pumped into the flask a rate of 1.3 g/min concurrent with the addition of monomer emulsion. After 2.4 hours the addition of monomer emulsion was completed, and the co-feeds were continued for an additional 0.5 hour while the temperature was maintained at 60° C. The dispersion was then cooled to 35° C. and filtered through a 100 mesh screen to remove any coagulum. The resulting dispersion was 45.1% solids, pH 9.0, and had a particle size of 150 nm by Brookhaven BI-90.

EXAMPLES 9A to 9C: POST ALKYLATION

To 430 g samples of the suspension of example 8 was added various alkylating agents. The suspensions were stirred for 10 minutes and then heated without stirring in sealed containers at 60° C. for 24 hours. The quantities of the reagents and the resulting data are shown in Table VI. In example 9C the pH of the suspension was adjusted to pH 7.0 with glacial acetic acid prior to the addition of propylene oxide.

TABLE VI

|   | 9A | 9B | 9C |
|---|---|---|---|
| Benzyl chloride | 1.95 g | 0.98 g | — |
| Propylene oxide | — | — | 1.25 g |
| Deionized water | — | — | 5.0 g |
| % solids | 45.1 g | 45.1 g | 44.6 g |
| pH | 4.8 | 5.4 | 7.2 |

EXAMPLES 10A to 10C: POST ALKYLATION

To 425 g of the suspension of example 3E was added various alkylating agents. The suspensions were stirred for 10 minutes and then heated without stirring in sealed containers at 60° C. for 24 hours. The quantities of the reagents and the resulting data are shown in Table VII. In Example 10C the pH of the suspension was adjusted to pH 7.0 with glacial acetic acid prior to the addition of propylene oxide.

TABLE VII

|   | 10A | 10B | 10C |
|---|---|---|---|
| Benzyl chloride | 2.58 g | 1.29 g | — |
| propylene oxide | — | — | 1.29 g |
| Deionized water | — | — | 5.0 g |
| % solids | 45.1 g | 45.1 g | 44.4 g |
| pH | 6.0 | 6.9 | 7.1 |

EXAMPLE 11: Adhesion of cationic poylmer -containing coating

Table VIII shows the adhesion of a cationic latex polymer-containing clear(unpigmented) coating to aged alkyd as a function of the initial wet latex pH.

The latex used was that of that of Example 3E which had been neutralized with acetic acid to the pH shown.

TABLE VIII

| pH | Wet Knife Adhesion (10 = Best) |
|---|---|
| 4.05 | 4 |
| 5.2 | 7 |
| 5.95 | 10 |
| 6.9 | 8 |
| 8.0 | 5 |
| 8.4 | 2 |
| 9.0 | 0 |

WET KNIFE ADHESION IS DESCRIBED IN TEST METHODS SECTION.

As shown in Table VIII adhesion declines rapidly outside pH about 5 to about 7.5. This is because at low pH the concentration of carboxyl groups present in the ionized form on the alkyd surface is low and at high pH the concentration of amine groups in the protonated state on the latex surface is also low.

EXAMPLE 12: pH DEPENDENCE

FIG. 1 shows the degree of dissociation for alkyd carboxyl groups and latex amine groups as a function of pH. The latexes used were those of examples 5A, 6A, and 6C. The amine functionality spans a range of base strengths. Maximum adhesion for each binder was predicted to be at the pH of the intersection of the respective amine protonation curve and the alkyd carboxylate curve. Dissociation constants were determined from conductometric titrations using the half neutralization point method. FIG. 1 predicts that adhesion should be a maximum at around pH=6.5 for the polymer of example 5B provided the total number of amine and carboxyl groups are approximately equal.

EXAMPLE 13: Preparation of Paints

Water based paints were made by mixing the materials in the amounts shown below. The grind ingredients were mixed and ground by a Cowls dissolver at 3800–4500 ft./min. (f.p.m. peripheral speed) for 15 to 20 minutes, then letdown with the letdown ingredients at low speed.

| | Amount by Weight |
|---|---|
| Grind Ingredients | |
| Water | 50.00 |
| Propylene Glycol | 50.00 |
| Dow Corning Z-6020[1] | 0.53 |
| Acetic Acid (20%) | 1.91 |
| Foamaster S (defoamer)[2] | 0.50 |
| Ti-Pure R-902[3] | 150.00 |
| Silica 218[4] | 210.18 |
| Letdown Ingredients | |
| Example 7B (BINDER) | 534.32 |
| Texanol[5] | 7.26 |
| Foamaster S | 1.00 |
| Water | 85.99 |
| Acrysol RM-825 (thickener)[6] | 8.00 |
| Acetic acid (20%) | 4.12 |
| | 1103.80 |

[1]Z-6020 is a trademark of Dow Corning Chemical Co
[2]Foamaster is a trademark of Diamond Shamrock Co
[3]Ti-Pure is a trademark of DuPont.
[4]Silica 218 is a trademark of Whittaker, Clark, and Daniels.
[5]Texanol is a trademark of Eastman Chemical Products for 2,2,4-trimethyl-1,3-pentenediol monisobutyrate.
[6]Acrysol is a trademark of Rohm and Haas Company The water based paint of Example 13 had the following properties: pigment volume concentration=35%; volume solids=40%; weight solids=54.56%; pH=6.5; 0.15% dispersant on pigment weight; and viscosity=90-100 Krebs units.

EXAMPLE 14: PAINT

Paints 14a-14L were made by replacing the 0.15% z-6020 (active material on pigment solids) in the paint of example 13 with the dispersants and levels shown in Table IX

TABLE IX

| Example | Dispersant | % on Pigment |
|---|---|---|
| 14a* | No Dispersant | 0 |
| 14b | Primafloc C-3 | 1.00 |
| 14c* | " | 0.50 |
| 14d* | " | 0.25 |
| 14e | Poly-DMAPMA | 1.00 |
| 14f | Corcat P-600 | 1.00 |
| 14g | Ethylene Diamine Acetic acid salt | 1.00 |
| 14h | Clarifloc 308 P | 1.00 |
| 14i | Silane Z-6020 | 0.50 |
| 14j | Silane A-1130 | 0.25 |
| 14k | Silane Z-6011 | 0.50 |
| 14l | Silane Z-6011 | 1.00 |

*Paints that do not pass stability heat age and roller tests.
Primafloc C-3 is a trademark of Rohm and Haas.
Poly-DMAPMA, experimental material, low MW, polydimethylaminopropyl methacryamide-acetic acid salt.
Clarifloc 308 P, allied Chemical polydiallydimethyl ammonium chloride.
Corcat P-600, Virginia Chemicals, polyethyleneimine-acetic acid salt
Z-6011, Dow Corning, 3-Aminopropyltriethoxysilane-acetic acid salt.
Z-6020, Down Corning, N-beta-(aminoethyl)-gama-aminopropyltrimethoxysilane-acetic acid salt.
A-110, Union Carbide, N-(beta-aminoethyl)-N-(Beta-aminoethyl)-gamma-aminopropyltrimethoxysilane-acetic acid salt.

EXAMPLE 15

Paint Examples 15a-15s were made as Example 13, but the acids shown in Table X were used to replace acetic acid on an equal molar basis to neutralize the polymeric binder latex and dispersant.

TABLE X

| Example | Acid |
|---|---|
| 15a | Formic |
| 15b | Acetic |
| 15c | Lactic |
| 15d | Propanoic |
| 15e | Isobutric |
| 15f | Hexanoic |
| 15g* | Octanoic |
| 15h* | Lauric |
| 15i | Benzoic |
| 15j | Toluene Sulfonic |
| 15k | Oxalic |
| 15l | Fumaric |
| 15m | Citric |
| 15n | Methane Sulfonic |
| 15o | Hypophosphorous |
| 15p | Hydrochloric |
| 15q | Fluoboric |
| 15r* | Sulfuric |
| 15s* | Phosphoric |

*Fluid grind could not be made even with all available formulation liquids.

EXAMPLE 16

Paint examples 16a-16m were made as in Example 13 except that polymeric binder latex example 5B was used and the surfactants shown in Table XI were post added to the paint.

TABLE XI

| Example | Post Added Surfactant and Level |
|---|---|
| 16a | 0% |
| 16b | 0.25% Nopcogen 22-0 Acetic Acid Salt |

TABLE XI-continued

| Example | Post Added Surfactant and Level |
|---|---|
| 16c | 0.50% Nopcogen 22-0 Acetic Acid Salt |
| 16d | 1.00% Nopcogen 22-0 Acetic Acid Salt |
| 16e | 2.00% Nopcogen 22-0 Acetic Acid Salt |
| 16f | 0.25% Arquad 12-50 |
| 16g | 0.50% Arquad 12-50 |
| 16h | 1.00% Arquad 12-50 |
| 16i | 2.00% Arquad 12-50 |
| 16j | 1.00% Triton X-405 |
| 16k | 2.00% Triton X-405 |
| 16l | 1.00% Abex 1404 |
| 16m | 2.00% Abex 1404 |

Nopcogen 22-0 is an imidazoline from oleic acid manufactured by Occidental Chemical Corp. (Diamond Shamrock).
Arquad 12-50 is dodecyl trimethylammonium chloride manufactured by Armak Industrial Chem. Div..
Triton X-405 is an octylphenoxy polyethoxy ethanol nonionic surfactant. Product of Rohm and Haas Company.
Abex 1404 is an amphoteric surfactant; product of Alcolac Inc..

EXAMPLE 17

Paint examples 17a–17j were made the same as example 13 except the latex examples shown in Table XII were substituted for the latex of example 7B.

TABLE XII

Quaternary Ammonia Functional Latexes

| Paint Example | Latex Example | pH | Alkylating Agent | Mole Ratio to latex amine |
|---|---|---|---|---|
| 17a | 3e | 6.5 | None | — |
| 17b | 10a | 6.5 | Benzyl Chloride | 1.0 |
| 17c | 10b | 6.1 | " | 0.5 |
| 17d | 10c | 6.2 | Propylene Oxide | 1.0 |
| 17e | 8 | 6.3 | None | — |
| 17f | 9a | 6.5 | Benzyl Chloride | 1.0 |
| 17g | 9b | 6.5 | " | 0.5 |
| 17h | 9c | 6.2 | Propylene Oxide | 1.0 |
| 17i | 6c | 4.7 | None | — |
| 17j | 6a | 5.4 | None | — |

EXAMPLE 18

Paint examples 18a–18d were made by mixing the materials in the amounts shown below in Table XIII. The grind ingredients were mixed and ground by a Cowles dissolver at 38-00-4500 ft./min. (f.pm.m peripheral speed) for 15 to 20 minutes, then letdown with the letdown ingredients at low speed;

TABLE XIII

Pigment Volume Concentration Ladder

Amount By Weight

| | 18a | 18b | 18c | 18d |
|---|---|---|---|---|
| Grind Ingredients | | | | |
| Water | 50 | 32 | 50 | 32 |
| Propylene Glycol | 50 | 50 | 50 | 50 |
| Dow Corning Z-6020[1] | 0.23 | 0.36 | 0.44 | 0.52 |
| Acetic Acid (20%) | 1.06 | 1.04 | 1.04 | 4.72 |
| Foamaster DG[2] | 0.12 | 0.23 | 0.12 | 0.12 |
| Ti-Pure R-902[3] | 131.25 | 131.24 | 131.24 | 131.25 |
| Silica 218[4] | 29.0 | 106.48 | 183.92 | 222.62 |
| Letdown Ingredients | | | | |
| Example 7b Latex | 616.08 | 543.6 | 471.12 | 434.88 |
| Texanol[5] | 8.36 | 7.4 | 6.4 | 5.92 |
| Colloid 643[6] | 2.00 | 2.00 | 2.00 | 2.00 |
| Water | 85.12 | 133.37 | 154.04 | 183.6 |
| Acrysol RM-825[7] | 8.28 | 14.71 | 17.08 | 25.60 |
| Acetic acid (20%) | 3.44 | 2.4 | 1.96 | 0.96 |
| Krebbs Viscosity | 85 | 90 | 86 | 86 |
| pH | 6.0 | 6.0 | 6.0 | 6.0 |
| Pigment Volume Concentration, % | 15 | 25 | 35 | 40 |
| Volume Solids % | 35 | 35 | 35 | 35 |

[1] Z-6020 is a trademark of Dow Corning Chemical Co.
[2] Foamaster is a trademark of Diamond Shamrock Co.
[3] Ti-Pure is a trademark of DuPont.
[4] Silica 218 is a trademark of Whittaker, Clark, and Daniels.
[5] Texanol is a trademark of Eastman Chemical Products for 2,2,4-trimethyl-1-1,3-pentenediol monoisobutyrate.
[6] Colloids is a trademark of Colloids Inc.
[7] Acrysol is a trademark of Rohm and Haas Co.

EXAMPLE 19

Paint examples 19a and 19b were made the same as example 18c, except latex example 3e was substituted for 7B as the binder. In addition, in Example 19b 100 weight units of 4% Natrosol 250 MHR in water (trademark of Hercules) was used as the thickener instead of Acrysol RM825. Water in the formulation was adjusted to maintain the volume solids of the formulation.

EXAMPLE 20a and 20b

Table XIV shows paint formulations with ground ion exchange resin Amberlite IRA 900 (trademark of Rohm and Haas Co.) and a control paint, respectively. The IRA 900 was ball milled with water for 8 hours to give and 18.8% solids dispersion.

TABLE XIV

Amount by Weight

| | 20a | 20b |
|---|---|---|
| Grind Ingredients | | |
| Water | | |
| Methyl Carbitol | — | 50.0 |
| Cavoc Mod APGX | 45.0 | 45.0 |
| Ti-Pure R-902 | 5.92 | 7.19 |
| Minex 4 | 100.0 | 100.0 |
| Silica 218 | 73.44 | 108.0 |
| Amberlite IRA 900 | 75.14 | 108.0 |
| Ground TX = 18.8 | 132.98 | — |
| Letdown Ingredients | | |
| Example 5b | 426.97 | 462.97 |
| Colloid 643 | 2.0 | 2.0 |
| Surfynol 140E | 2.0 | 2.0 |
| Troysan Polyphase AF-1 | 10.0 | 10.0 |
| Texanol | 6.32 | 6.32 |
| Acetic Acid 20% | 2.66 | 2.66 |
| Acrysol RM-825 | 21.7 | 10.0 |
| Water | 88.4 | 157.0 |
| Pigment Volume Solids % | 35 | 35 |
| Volume Solids % | 35 | 35 |

Methyl Carbitol is a trademark of Union Carbide Corp.
Minex is a trademark of Indusmin Limited.
Surfynol is a trademark of Air Products Co.
Troysan is a trademark of Troy Chemical Co.

EXAMPLE 21a and 21b

Table XV show paint formulations with reactive pigments.

TABLE XV

Amount by Weight

| | 21a | 21b |
|---|---|---|
| Grind Ingredients | | |
| Water | 50.00 | 50.00 |
| Propylene Glycol | 50.00 | 50.00 |
| Z-6011 Premix | 11.28 | 11.28 |
| Acetic Acid 20% | 6.34 | 7.29 |
| Foamaster S | 0.50 | 0.50 |
| Ti-Pure R-902 | 150.00 | 150.00 |

TABLE XV-continued

|  | Amount by Weight | |
|---|---|---|
|  | 21a | 21b |
| Silica 218 | 188.85 | 203.36 |
| K-White 82 | 25.00 | — |
| Nalzin 2 | — | 10.00 |
| Letdown |  |  |
| Example 7B | 534.41 | 534.41 |
| Texanol | 7.26 | 7.26 |
| Foamaster S | 1.00 | 1.00 |
| Acetic Acid 20% | 0.98 | 3.26 |
| Water | 75.08 | 70.58 |
| Acrysol RM-825 | 7.56 | 9.80 |
| Krebbs viscosity | 87 | 87 |
| pH | 6.2 | 6.5 |
| Pigment Volume Concentration | 35 | 35 |
| Volume Solids % | 40 | 40 |

Z-6011 is a product of Dow Corning. Premix is made by mixing 10 parts by weight Z-6011, 20 parts Methyl Carbitol, and 1 part water, the mix is equilibrated at room temperature for 4 hours before use. K-White 82 is a trademark of Teikoku Kato Co., Japan. Nalzin 2 is a trademark of NL Industries.

EXAMPLE 22

Example 22a and 22b were made the same as Example 13, except the amount of acetic acid was adjusted to vary paint pH. Paint Example 22c was made the same as 17b, except the pH was adjusted to 8.5 demonstrating the increased stability of quaternary ammonia functional latexes at higher pH's than amine functional latexes. The results are shown in Table XVI.

TABLE XVI

The Effect of pH on Paint Stability

| Example | pH | Roller Stability |
|---|---|---|
| 22a | 6.6 | Pass |
| 22b | 7.1 | Fail |
| 22c | 8.4 | Pass |

EXAMPLE 23: Comparative

Table XVII shows the formulation of a conventional exterior flat topcoat.

TABLE XVII

|  | Amount by Weight |
|---|---|
| Grind Ingredients |  |
| Natrosol 250 MHR 2.5% in water | 75 |
| Water | 60 |
| Tamol 731 | 11.3 |
| Nopco NDW | 1.0 |
| Triton CF-10 | 2.4 |
| Ethylene Glycol | 23.2 |
| Ti-Pure R-960 | 234.4 |
| Minex 4 | 171.6 |
| Attagel 50 | 5.0 |
| Letdown Ingredients |  |
| Rhoplex AC-64 | 352.23 |
| Ammonia | 1.58 |
| Dowcil 75, 20% in water | 1.00 |
| Nopco NDW | 1.00 |
| Texanol | 10.60 |
| Propylene Glycol | 32.40 |
| Natrosol 250 MHR 2.5% in water | 127.50 |
| Water | 47.74 |

Krebbs viscosity 100. pH = 9.50
Pigment volume concentration = 40%; Volume solids = 38%.
Tamol, Triton, and Rhoplex are trademarks of the Rohm and Haas Co.
Nopco is a trademark of the Diamond Shamrock Co.
Attagel is a trademark of the Engelhard.
Dowcil is a trademark of Dow Chemical Co.

EXAMPLE 24: COMPARATIVE

Table XVIII shows the formulation of a conventional anionic latex primer formulation.

TABLE XVIII

|  | Amount by Weight |
|---|---|
| Grind Ingredients |  |
| Propylene Glycol | 50.00 |
| Water | 43.30 |
| Foamaster VL | 2.00 |
| Tamol 960 | 7.30 |
| Acrysol RM-825 | 8.00 |
| Ti-Pure R-900 | 100.00 |
| Kadox 515 | 12.00 |
| Nyad 400 | 181.30 |
| Letdown Ingredients |  |
| Water | 167.90 |
| Rhoplex MV-23 | 470.60 |
| Texanol | 5.00 |
| Foamaster VL | 3.00 |
| Skane M-8 | 2.00 |
| Triton GR-7M | 1.00 |
| Ammonia 28% | 1.80 |
| Acrysol TT-615 | 1.20 |
| Water | 3.80 |

Pigment Volume Solids = 34.4%. Volume Solids = 32.2%.
Krebbs Viscosity = 100–110. pH = 9.0–9.5.
Kadox 515 (Zinc Oxide) is a trademark of New Jersey Zinc Co.
Nyad 400 is a trademark of Nyco Div; of Process Minerals, Inc.
Skane M-8 is a product of Rohm and Haas Co.

EXAMPLE 26

This example demonstrates the performance properties of the cationic polymeric binder-containing coatings of the invention.

1. Effect on PVC

| Example | PVC | Alkyd Adhesion Cross Hatch | Stain Blocking Cedar & Redwood | Interior | Nail Head Rusting |
|---|---|---|---|---|---|
| 18a | 15 | 10 | 8 | 7 | 8 |
| 18b | 25 | 10 | 6 | 6 | 7 |
| 18c | 35 | 10 | 6 | 5 | 6 |
| 18d | 40 | 10 | 4 | 4 | 6 |

Conclusions: Stain Blocking declines as PVC is raised. Alkyd adhesion can be obtained with low as well as high PVC coatings.

EXAMPLE 27

2. Effect of DMAPMA Level on Adhesion

Paint examples 27a–27c are the same as example 13, except latex examples 2b, 2c, and 2d were used, respectively, instead of 7b.

| Example | DMAPMA level % on Monomer | Alkyd Adhesion Knife |
|---|---|---|
| 27c | 0 | 0–1 |
| 27b | 1 | 4–6 |
| 27a | 1.99 | 8–10 |

3. The Effect of Natrosol 250 MHR vs. Acrysol RM-825 on stain blocking properties.

| Example | Thickener | Cedar & Redwood Stain Blocking |
|---|---|---|
| 19a | Acrysol RM-825 | 6 |
| 19b | Natrosol 250 MHR | 4 |

4. Effect of Ground Ion Exchange Resin (IRA-900) on stain blocking properties.

| Example |  | Redwood | Cedar |
|---|---|---|---|
| 20a | IRA-900 | 6 | 7 |

-continued

| | 20b Control | 4 | | 5 | |
|---|---|---|---|---|---|

5. Effect of Reactive Pigments on properties.

| Example | Stain Blocking Cedar & Redwood | Interior | Aged Alkyd Adhesion | Early Blist. Chalk | Nail Head Rust Bleed |
|---|---|---|---|---|---|
| 14k | 6 | 6.5 | 8 | None | 3 |
| 21a | 8 | 8.5 | 8 | None | 6 |
| 21b | 9 | 9 | 8 | None | 7 |
| Glidden Alkyd | 9–10 | 9 | — | None | 8 |
| 24 | 4 | 5 | 0–1 | None | 7 |
| 23 | 1 | 1 | 4 | Some | 1 |

Glidden Alkyd Primer number 3651 - The Glidden Company.

6. The effect of Amphoteric surfactant on nail head rusting.

| Example | Nail Head Rusting |
|---|---|
| 17a no amphoteric | 1 |
| 13 | 3 |
| 16a | 4 |

7. The effect of alkylating (making a latex quaternary ammonium functional).

| Example | Functionality | Alkyd Adhesion Cross Hatch |
|---|---|---|
| 17a | DMAPMA | 10 |
| 17b | Quat DMAPMA | 10 |
| 22c | Quat DMAPMA pH = 8.5 | 10 |
| 17c | Quat DMAPMA | 10 |
| 17d | Quat DMAPMA | 10 |
| 17e | DMAEMA | 0 |
| 17f | Quat DMAEMA | 7 |
| 17g | Quat DMAEMA | 10 |
| 17h | Quat DMAEMA | 10 |

8. The effect of using Fuller's earth pigments on stain blocking.

| | Examples Amounts by Weight | | | |
|---|---|---|---|---|
| | 28a | 28b | 28c | 28d |
| Grind Ingredients | | | | |
| Water | 87.8 | 90.0 | 80.0 | 70.0 |
| Propylene Glycol | 50.0 | 50.0 | 50.0 | 50.0 |
| Z-6020 | 0.9 | 0.9 | — | — |
| Acetic Acid 20% | 2.2 | 2.0 | — | — |
| Tamol 731 | — | — | 14.6 | 14.7 |
| Foamaster S | 0.5 | 0.5 | 0.5 | 0.5 |
| Ti-Pure R-902 | 150.0 | 150.0 | 150.0 | 150.0 |
| Silica 218 | 183.33 | 178.1 | 178.1 | 204.9 |
| Attasorb LVM | 25.0 | 25.0 | 25.0 | — |
| Kadox 515 | — | 12.0 | 12.0 | 12.0 |
| Letdown Ingredient | | | | |
| Example | 534.4 | 534.4 | — | — |
| Rhoplex MV-23 | — | — | 574.2 | 574.2 |
| Foamaster | 1.0 | 1.0 | 1.0 | 1.0 |
| Texanol | 7.3 | 7.3 | 7.3 | 73 |
| Acrysol RM-825 | 5.4 | 6.3 | 5.6 | 6.6 |
| Acetic Acid 20% | 2.4 | 6.8 | — | — |
| Water | 51.6 | 44.2 | 16.4 | 25.2 |
| pH | 6.6 | 6.6 | 8.9 | 8.9 |
| Krebbs Viscosity | 102 | 112 | 102 | 94 |
| Pigment Vol. Solids | 35% | 35% | 35% | 35% |
| Volume Solids | 40% | 40% | 40% | 40% |

Attasorb is a trademark of Engelhard Co.

| Example | Type | Attasorb | Cedar Stain Blocking |
|---|---|---|---|
| 13 | Cationic | 0 | 6 |
| 28a | Cationic | 25 | 8–9 |
| 28b | Cationic | 25 | 8–9 |
| 28c | Anionic | 25 | 4–5 |
| 28d | Anionic | 0 | 4–5 |

EXAMPLE 29

Adhesion of paints made with the polymeric binders of examples 6A and 6C at their optimum pH would be expected to be much lower than for paints made with the polymeric binder of example 5B at its optimum pH. Table IXX shows the effect of base strength on adhesion to alkyd for paint examples 16a, 17e, and 17i made with the binders identified in FIG. 1.

TABLE IXX

The Effect of Base Strength on Alkyd Adhesion

| Paint Example | Binder Example | Binder pKb | Paint pH | Wet Knife Adhesion |
|---|---|---|---|---|
| 16a | 5b | 7 | 6.1 | 10 |
| 17j | 6a | 9.4 | 5.4 | 0 |
| 17i | 6c | 10.6 | 4.7 | 0 |

Adhesion of 10 is best.

EXAMPLE 30

Table XX shows the effects of neutralizing acid on the adhesion to alkyd and grind viscosity.

TABLE XX

| | | Grind viscosity (cps) | | | |
|---|---|---|---|---|---|
| Sample | Acid | Initial | With Extra Water | Extra Water 1b/100 gal. | Alkyd Wet Knife Adhesion |
| 15a | Formic | 6000 | — | — | 8 |
| 15b | acetic | 2000 | — | — | 9 |
| 15c | Lactic | — | 2000 | 10 | 8 |
| 15d | Propanoic | 4000 | — | — | 7 |
| 15e | Isobutric | 2500 | — | — | 7 |
| 15f | Hexanoic | Gell | 62000 | 38.5 | 6 |
| 15g | Octanoic | Gell | Gell | — | — |
| 15h | Lauric | Gell | Gell | 50 | — |
| 15i | Benzoic | Gell | 82000 | 10 | 6 |
| 15j | Toluene | Gell | 1500 | 20 | 4 |
| 15k | Oxalic | Gell | 9000 | 50 | 7 |
| 15l | Fumaric | Gell | 15000 | 52 | 5 |
| 15m | Citric | Gell | 21000 | 50 | 3 |
| 15n | Methane Sulfonic | 8500 | — | — | 6 |
| 15o | Hypo-phosphorous | 12000 | — | — | 9 |
| 15p | Hydrochloric | 3500 | — | — | 8 |
| 15q | Fluoboric | 3500 | — | — | 6 |
| 15r | Sulfuric | Gell | Gell | 50 | — |
| 15s | Phosphoric | Gell | Gell | 50 | — |

All paints were adjusted to pH = 6.0. One year old Duron Forest Green Alkyd. Brookfield viscosity, using model LVT, spindle 4 at 6 rpm.

EXAMPLE 31: Post Added or Emulsion Polymerization Surfactant-Effect on Adhesion The type of surfactant present in the paint or latex as polymerization surfactant or as a post-add can have a large influcence on adhesion. In particular, cationic surfactants are to be avoided, or their concentration at least kept to a minimum, because they compete with cationic binder for the anionic sites on substrates.

To paint Examples 16a various surfactants were post-added to demonstrate the effect of surfactant type on adhesion to an anionic alkyd substrate. Surfactants were added as weight percent, based on binder solids in the paint. The results are shown in Table XXI.

TABLE XXI

| EXAMPLE | Post Added Surfactant and Level | Wet Knife Adhesion |
|---|---|---|
| 16a | 0% | 8 |
| 16b | 0.25% Nopcogen 22-0 Acetic Acid Salt | 8 |
| 16c | 0.50% Nopcogen 22-0 Acetic Acid Salt | 8 |
| 16d | 1.00% Nopcogen 22-0 Acetic Acid Salt | 5 |
| 16e | 2.00% Nopcogen 22-0 Acetic Acid Salt | 1 |
| 16f | 0.25% Arquad 12-50 | 8 |
| 16g | 0.50% Arquad 12-50 | 5 |
| 16h | 1.00% Arquad 12-50 | 1 |
| 16i | 2.00% Arquad 12-50 | 0 |
| 16j | 1.00% Triton X-405 | 8 |
| 16k | 2.00% Triton X-405 | 8 |

TABLE XXI-continued

| EXAMPLE | Post Added Surfactant and Level | Wet Knife Adhesion |
|---------|---------------------------------|--------------------|
| 16l | 1.00% Abex 1404 | 8 |
| 16m | 2.00% Abex 1404 | 8 |

Nopcogen 22-0 is an imidazoline from oleic acid manufactured by Occidental Chemical Corp. (Diamond Shamrock).
Arquad 12-50 is dodecyl trimethylammonium chloride manufactured by Armak Industrial Chem Div..
Triton X-405 is an octylphenoxy polyethoxy ethanol nonionic surfactant. Product of Rohm and Haas Company.
Abex 1404 is an amphoteric surfactant; product of Alcolac Inc..

Table XXI demonstrates that low levels of cationic surfactant can be tolerated, but concentrations on the order of about 1% on latex and higher, depending on the structure of the surfactant, significantly compromise adhesion. Anionic surfactants are also undesirable in that they will complex up the cationic latex sites and may lead to paint stability problems. Most desirable is the use of nonionic and, or amphoteric surfactants. A mixture of the two being the most preferred for the best balance of properties.

EXAMPLE 32: Pigment dispersant

This example (Table XXII) demonstrates the adhesion of coatings made with amine functional silanes vs. conventional polymeric amine pigment dispersing agents and an impractical paint made with no dispersant. The paint made with no dispersant was made using the latex as dispersant and is impractical because it is not stable to heat aging or roller shear testing.

TABLE XXII

Effect of Dispersant Type of Adhesion

| Example | Dispersant | % On Pigment | Wet Alkyd Adhesion 2 yr. old | 6 yr. old Alkyd |
|---------|------------|--------------|------------------------------|-----------------|
| 14a* | No Dispersant | —* | 8 | — |
| 14b | Primafloc C-3 | 1 | 4 | — |
| 14c* | " | 0.5* | 5 | — |
| 14d* | " | 0.25* | 7-8 | 4 |
| 14e | Poly-DMAPMA | 1 | 6 | — |
| 14f | Corcat P-600 | 1 | 3 | — |
| 14g | Ethylene diamine-Acetic acid salt | 1 | 1 | — |
| 14h | Clarifloc 308P | 1 | 2 | — |
| 13 | Silane Z-6020 | 0.15 | 9 | 8 |
| 14i | Silane Z-6020 | 0.5 | 9 | — |
| 14j | Silane A-1130 | 0.25 | 9 | — |
| 14k | Sialne Z-6011 | 0.5 | 9 | — |
| 14l | Silane Z-6011 | 1.0 | 8 | — |
| 23 | AC64 Anionic Control | | 4 | — |
| 24 | Anionic Primer Control | | 1 | — |

*Paints that do not pass stability tests.
The above test is very severe in that the alkyds are very old, and paints dried only for 18 hrs.
Primafloc C-3, Rohm and Haas, low MW polymeric amine-acetic acid salt.
Poly-DMAPMA, experimental material, low MW, polydimethylaminopropylmethacrylamide-acetic acid salt.
Clarifloc 308P, Allied Chemical, polydiallyldimethyl ammonium chloride.
Corcat P-600, Virginia Chemicals, polyethyleneimine-acetic acid salt.
Z-6011, Dow Corning. 3-Aminopropyltriethoxysilane-acetic acid salt.
Z-6020, Dow Corning. N-beta-(aminoethyl)-gama-aminopropyltrimethoxysilane-acetic acid salt.
A-1130, Union Carbide. N-(beta-aminoethyl)-N-(beta-aminoethyl)-gamma-aminopropyltrimethoxysilane-acetic acid salt.

What is claimed is:

1. A pigmented cationic coating composition consisting of cationic and nonionic components, said coating composition comprising a cationic polymeric binder for coatings, said binder comprising an aqueous dispersion of filming cationic functional polymer particles formed from at least one monoethylenically unsaturated amine functional monomer, wherein an amine functional group is neutralized by the addition of an amount of at least one monoprotic acid effective to neutralize at least a portion of said amine functional groups; pigment particles and an amount of a cationic pigment dispersant effective to selectively absorb on or chemically react with said pigment particles.

2. A pigmented cationic coating composition consisting of cationic and nonionic components, said coating composition comprising an aqueous dispersion of film forming cationic functional polymer particles comprising at least one quaternary ammonium functional group, pigment particles and an amount of a cationic pigment dispersant effective to selectively absorb on or chemically react with said pigment particles.

3. The coating composition of claim 1 or 2 where said pigment dispersant is an amine functional silane.

4. The coating composition of claim 1 or 2 wherein the concentration of said pigment dispersant ranges from about 0.1 to about 1.5 percent of by weight on weight of said pigment.

5. The pigmented coating composition of claim 1 or 2 wherein said pigment comprises polyvalent metal ions.

6. The pigmented coating composition of claim 5 wherein said polyvalent metal ion is selected from the group of metal ions consisting of aluminum and copper.

* * * * *